US012623349B1

(12) United States Patent
Sulaiman et al.

(10) Patent No.: US 12,623,349 B1
(45) Date of Patent: May 12, 2026

(54) SYSTEM AND METHOD FOR AUTOMATED OPTICAL DEVIATION DETECTION AND CORRECTION PROCEDURE

(71) Applicant: Pramana, Inc., Cambridge, MA (US)

(72) Inventors: Mohammad Abdul Sulaiman, Visakhapatnam (IN); Omkar Appasaheb Kabadagi, Bangalore (IN); Vaishnavi K B, Bengaluru (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/243,391

(22) Filed: Jun. 19, 2025

(51) Int. Cl.
| | |
|---|---|
| *B25J 9/16* | (2006.01) |
| *G01B 5/25* | (2006.01) |
| *G06T 7/00* | (2017.01) |
| *G06T 7/13* | (2017.01) |
| *G06T 7/33* | (2017.01) |
| *G06T 7/73* | (2017.01) |
| *G06V 10/764* | (2022.01) |

(52) U.S. Cl.
CPC ........... *B25J 9/1692* (2013.01); *B25J 9/1633* (2013.01); *B25J 9/1697* (2013.01); *G01B 5/25* (2013.01); *G06T 7/0002* (2013.01); *G06T 7/13* (2017.01); *G06T 7/337* (2017.01); *G06T 7/74* (2017.01); *G06T 2200/24* (2013.01); *G06T 2207/20081* (2013.01); *G06T 2207/20084* (2013.01); *G06T 2207/30168* (2013.01); *G06V 10/764* (2022.01)

(58) Field of Classification Search
CPC ...... B25J 9/1692; B25J 9/1633; B25J 9/1697; G01B 5/25; G06T 7/0002; G06T 7/13; G06T 7/337; G06T 7/74; G06T 2200/24; G06T 2207/20081; G06T 2207/20084; G06T 2207/30168; G06V 10/764
See application file for complete search history.

(56) References Cited

U.S. PATENT DOCUMENTS

| | | | | |
|---|---|---|---|---|
| 10,654,655 | B2 * | 5/2020 | Newberg | ............... G02B 21/26 |
| 11,480,779 | B2 * | 10/2022 | Vink | ............... G01N 35/00029 |
| 2010/0259805 | A1 | 10/2010 | Osipchuk et al. | |

(Continued)

FOREIGN PATENT DOCUMENTS

| | | |
|---|---|---|
| CN | 217766036 U | 11/2022 |
| IN | 202441077125 A | 10/2024 |

(Continued)

*Primary Examiner* — Harry Y Oh
(74) *Attorney, Agent, or Firm* — CALDWELL LLC

(57) ABSTRACT

A system and method for automated optical deviation detection and correction is disclosed. The system includes a scanner, wherein the scanner includes one or more sensors positioned on the scanner, wherein the one or more sensors includes at least an optical sensor and a force-torque sensor; and a stage configured to hold a slide; at least a processor; and a memory communicatively connected to the at least a processor, wherein the memory contains instructions configuring processor to: receive sensor data from the one or more sensors, wherein the sensor data includes image data received from the optical sensor and associated with at least a slide and a tactile datum; detect a positional deviation in the image data relative to an alignment baseline; determine whether the positional deviation is within a correction threshold; and initiate a correction procedure associated with the at least a slide.

20 Claims, 9 Drawing Sheets

(56) References Cited

U.S. PATENT DOCUMENTS

2011/0249327 A1 * 10/2011 Yamamoto ............. G02B 21/26
                                                        359/391
2015/0300931 A1 * 10/2015 Dockrill ................. G01N 1/312
                                                        435/309.1
2016/0147056 A1 * 5/2016 Corwin .................. G02B 27/32
                                                        359/391
2019/0100383 A1 * 4/2019 Newberg ................. G01V 8/12

FOREIGN PATENT DOCUMENTS

JP          2004320261 A     11/2004
WO     WO-2025137536 A1 *  6/2025   ............. H04N 23/64

* cited by examiner

SYSTEM AND METHOD FOR AUTOMATED OPTICAL DEVIATION DETECTION AND CORRECTION PROCEDURE

FIELD OF THE INVENTION

The present invention generally relates to the field of image processing. In particular, the present invention is directed to a system and method for automated optical deviation detection and correction procedure.

BACKGROUND

In the field of optical scanning and imaging systems, various methods have been developed to address the issue of positional deviation of scanned images. Traditional approaches often involve manual calibration and alignment procedures, which require significant human intervention and are prone to errors. These methods typically rely on visual inspection and manual adjustments. While effective to some extent, these manual processes are time-consuming and can lead to inconsistencies in image quality and alignment.

SUMMARY OF THE DISCLOSURE

In some aspects, the techniques described herein relate to a system for automated optical deviation detection and correction procedure, the system including: a scanner, wherein the scanner includes: one or more sensors positioned on the scanner, wherein the one or more sensors includes at least an optical sensor and a force-torque sensor; and a stage configured to hold a slide; at least a processor; and a memory communicatively connected to the at least a processor, wherein the memory contains instructions configuring processor to: receive sensor data from the one or more sensors, wherein the sensor data includes: image data received from the optical sensor and associated with at least a slide; and a tactile datum received from the force-torque sensor; detect a positional deviation in the image data relative to an alignment baseline; determine whether the positional deviation is within a correction threshold; and initiate a correction procedure associated with the at least a slide, wherein initiating the correction procedure includes: generating a correction datum if the positional deviation is within the correction threshold; and generating a deviation flag if the positional deviation exceeds the correction threshold.

In some aspects, the techniques described herein relate to a method for automated optical deviation detection and correction procedure, the method including: receiving, using at least a processor, sensor data from one or more sensors positioned on a scanner, wherein the sensor data includes image data received from at least an optical sensor of the one or more sensors and associated with at least a slide placed on the scanner and a tactile datum received from a force-torque sensor of the one or more sensors, wherein the scanner includes a stage configured to hold the slide; detecting, using the at least a processor, a positional deviation in the image data relative to an alignment, wherein detecting the positional deviation includes spatially aligning the tactile datum to the image data; determining, using the at least a processor, whether the positional deviation is within a correction threshold; and initiating, using the at least a processor, a correction procedure associated with the at least a slide, wherein initiating the correction procedure includes: generating a correction datum if the positional deviation is within the correction threshold; and generating a deviation flag if the positional deviation exceeds the correction threshold.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for automated optical deviation detection and correction procedure. The system includes a scanner, wherein the scanner includes: one or more sensors positioned on the scanner, wherein the one or more sensors includes at least an optical sensor and a force-torque sensor; and a stage configured to hold a slide; at least a processor; and a memory communicatively connected to the at least a processor, wherein the memory contains instructions configuring processor to: receive sensor data from the one or more sensors, wherein the sensor data includes: image data received from the optical sensor and associated with at least a slide; and a tactile datum received from the force-torque sensor; detect a positional deviation in the image data relative to an alignment baseline; determine whether the positional deviation is within a correction threshold; and initiate a correction procedure associated with the at least a slide, wherein initiating the correction procedure includes: generating a correction datum if the positional deviation is within the correction threshold; and generating a deviation flag if the positional deviation exceeds the correction threshold. Exemplary embodiments illustrating aspects of the present disclosure are described below in the context of several specific examples.

Figure 1:
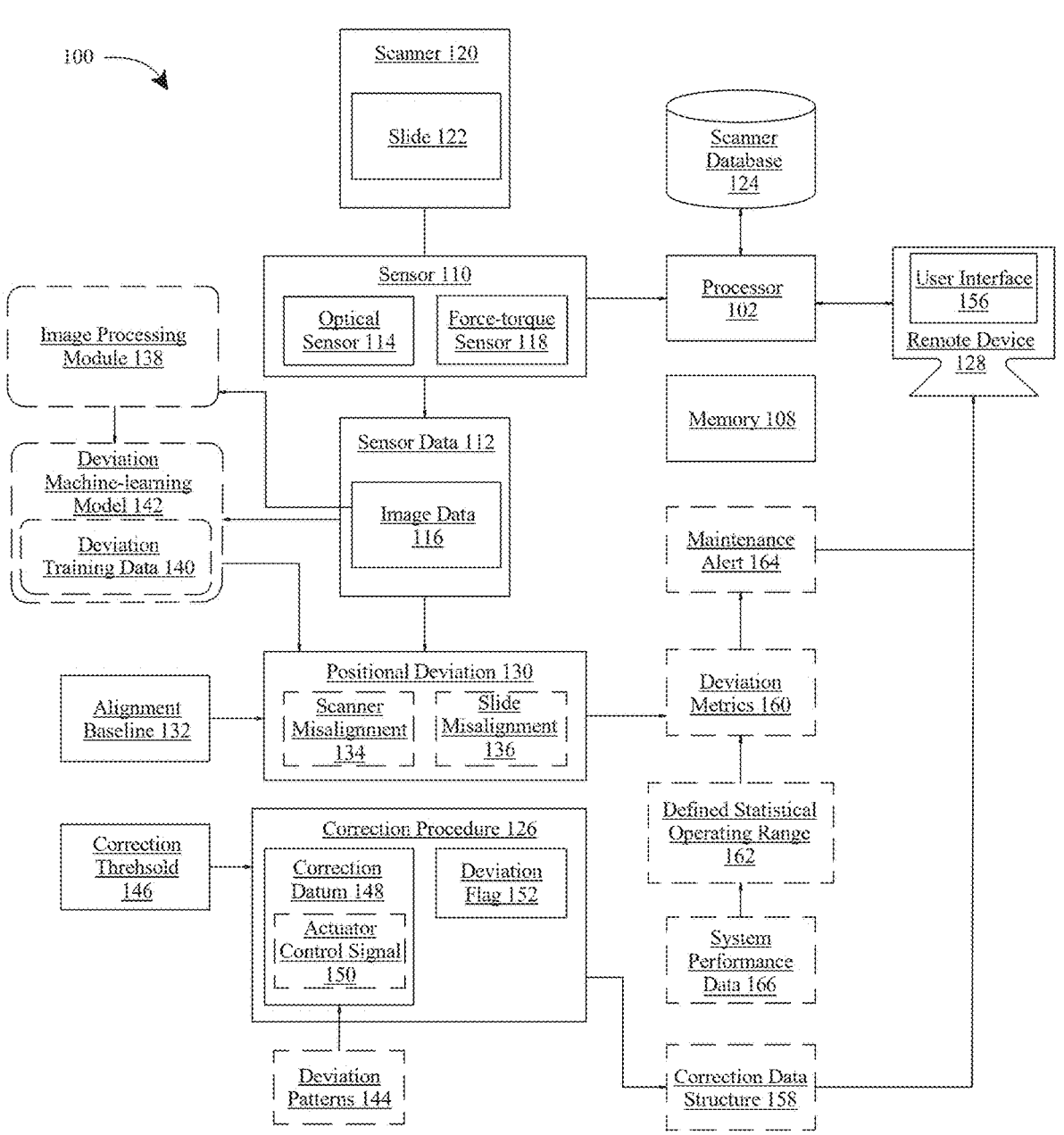
FIG. 1 illustrates a block diagram of an exemplary system for automated optical deviation detection and correction procedure.

Referring now to FIG. 1, an exemplary embodiment of an system 100 for automated optical deviation detection and correction procedure is illustrated. System 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a memory 108 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, system 100 includes one or more sensors 110. For the purposes of this disclosure, a "sensor" is a device that produces an output signal for the purpose of sensing a physical phenomenon. For example, and without limitation, sensor 110 may transduce a detected phenomenon, such as without limitation, temperature, voltage, current, pressure, speed, motion, light, moisture, and the like, into a sensed signal. Sensor 110 may output the sensed signal (sensor data 112). Sensor 110 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by sensor 110 may include circuitry, computing devices, electronic components or a combination thereof that translates into at least an electronic signal configured to be transmitted to another electronic component.

With continued reference to FIG. 1, in some embodiments, sensor 110 includes an optical sensor 114. For the purposes of this disclosure, an "optical sensor" is a device that detects light or other electromagnetic radiation within or near the visible, ultraviolet, or infrared spectrum and generates an electrical signal as a function of the detected radiation. As a non-limiting example, optical sensor 114 may include camera. As a non-limiting example, optical sensor 114 may include charge-coupled devices (CCD), complementary metal-oxide-semiconductor (CMOS) sensors, photodiodes, phototransistors, light-dependent resistors (LDR), position-sensitive detectors, multispectral or hyperspectral imaging sensors, or a combination thereof. The optical sensor 114 may be configured to capture still images, video sequences, or discrete optical measurements from one or more fields of view. In some embodiments, optical sensor 114 may operate alone or in combination with additional sensors to detect characteristics such as object position, orientation, surface texture, or alignment of physical components. The optical data or image data 116 generated may be transmitted via wired or wireless communication to a processing system for further analysis, such as deviation detection, calibration, or correction operations.

With continued reference to FIG. 1, in some embodiments, sensor 110 may include a force sensor. For the purposes of this disclosure, a "force sensor" is a sensor that that converts an input mechanical load, weight, tension, compression or pressure into an electrical output signal. As a non-limiting example, the force sensor may include a tension force sensor, compression force sensor, tension and compression force sensor, and the like. As another non-limiting example, the force sensor may include a strain gauge, load cell, piezoelectric sensor, capacitive sensor, magnetic sensor, and the like. In some embodiments, the force sensor may be configured to transform a pressure into an analogue electrical signal. In some embodiments, the force sensor may be configured to transform a force into a digital signal.

With continued reference to FIG. 1, sensor 110 includes a force-torque sensor 118. For the purposes of this disclosure, a "force-torque sensor" is a sensor that detects and converts applied forces and torques into electrical output signals. In some embodiments, force-torque sensor 118 may be configured to measure mechanical stress applied to at least a scanner 120 during a scanning operation. For the purposes of this disclosure, "mechanical stress" refers to internal forces per unit area within a structural component, resulting from externally applied loads, contact interactions, or system movement. In some embodiments, force-torque sensor 118 may be positioned on or within a mechanical structure of the scanner 120, such as a mounting frame, support arm, or actuator assembly, and may be configured to detect both linear forces and rotational torques experienced by the scanner 120 during slide handling, alignment, or image acquisition. In some embodiments, force-torque sensor 118 may be used to identify abnormal stress patterns that indicate scanner misalignment, collision, or undesired contact with a slide 122 or surrounding hardware. As a non-limiting example, the measurements obtained may include axial loads, lateral forces, or torsional effects, and may be sampled in real time or at periodic intervals. In some embodiments, resulting force-torque data may be transmitted as sensor data 112 to a processor 102 for interpretation and used to support deviation detection, initiate correction procedures, or trigger safety responses to prevent damage or degradation of the scanner system. As a non-limiting example, force-torque sensor 118 may include multi-axis sensors capable of simultaneously measuring forces along X, Y, and Z axes, and torques about those axes. As another non-limiting example, force-torque sensor 118 may include strain gauge-based transducers, piezoelectric sensors, capacitive force-torque sensors, or magneto resistive sensors. In some embodiments, force-torque sensor 118 may be configured to output analog or digital signals corresponding to applied normal and shear forces, as well as pitch, yaw, and roll torques. For the purposes of this disclosure and as would be appreciated by someone of ordinary skill in the art, "force" refers to a linear interaction that causes a change in motion or deformation, and "torque" refers to a rotational equivalent of force that causes angular displacement. In some embodiments, force-torque sensor 118 may be used to detect mechanical stress, contact events, or misalignment conditions in a robotic or scanning system, and May transmit its output via wired or wireless communication to a processing module for deviation analysis, calibration, or system safety control.

With continued reference to FIG. 1, in some embodiments, sensor 110 may include a pressure sensor. Pressure, for the purposes of this disclosure, and as would be appreciated by someone of ordinary skill in the art, is a measure of force required to stop a fluid from expanding and is usually stated in terms of force per unit area. The pressure sensor that may be included in at least a sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

With continued reference to FIG. 1, in one or more embodiments, at least a sensor may include a moisture sensor. "Moisture," as used in this disclosure, is the presence of water, which may include vaporized water in air, condensation on the surfaces of objects, or concentrations of liquid water. Moisture may include humidity. "Humidity," as used in this disclosure, is the property of a gaseous medium (almost always air) to hold water in the form of vapor. In one or more embodiments, at least a sensor may include electrical sensors. Electrical sensors may be configured to measure voltage across a component, electrical current through a component, and resistance of a component. In one or more embodiments, at least a sensor may include thermocouples, thermistors, thermometers, infrared sensors, resistance temperature sensors (RTDs), semiconductor based integrated circuits (ICs), a combination thereof, or another undisclosed sensor type, alone or in combination.

With continued reference to FIG. 1, one or more sensors 110 is positioned on at least a slide scanner 120. System 100 includes a scanner 120. For the purposes of this disclosure, a "scanner" is a device configured to capture digital representations of physical slides, specimens, or substrates placed on or within the scanner's imaging field. In some embodiments, scanner 120 may include mechanical components for receiving, positioning, and translating slides 122 into an imaging region, as well as optical components such as lenses, illumination systems, and optical sensors 114 to acquire two-dimensional or three-dimensional image data 116. As a non-limiting example, scanner 120 may include a motorized stage for precision slide movement, a camera array for capturing tiled image segments, and a control interface for automated or semi-automated scanning operations. In some embodiments, scanner 120 may be configured to operate as part of a robotic system for high-throughput slide digitization in pathology, biological imaging, or industrial inspection environments. For the purposes of this disclosure, a "slide" is a thin, flat substrate upon which a sample or object of interest is mounted for optical examination. In some embodiments, scanner 120 may be operatively coupled to one or more sensors 110.

With continued reference to FIG. 1, in some cases, scanners 120 may include devices or systems used to digitize slides 122 containing biomedical specimens (e.g., tissue samples). As a non-limiting example, scanners 120 may include digital cameras, digital microscopes, digital pathology scanners, or the like. During scanning operation of scanners 120, scanners 120 may capture digital images (image data 116) of slides 122 and send them to processor 102 using network. For efficient storage and/or transmission, images may be compressed prior to or during transmission. Security measures such as encryption, authentication (including multi-factor authentication), SSL, HTTPS, and other security techniques may also be applied. In some embodiments, processor 102 and/or remote device may be configured to control the operation of scanners 120 to automate the slide digitization process. For example, and without limitation, processor 102 may send instructions to scanners 120 to scan or rescan selected portions of a slide 122. Additional disclosure related to scanners and slide digitization process may be found in U.S. patent application Ser. No. 18/702,947, filed on Mar. 12, 2024, entitled "SYSTEMS AND METHODS FOR INLINE QUALITY CONTROL OF SLIDE DIGITIZATION,", which is incorporated herein by reference in its entirety.

With continued reference to FIG. 1, in some embodiments, system 100 may include a cluster of scanners 120. For the purposes of this disclosure, a "cluster" is a group of various components that is gathered to perform a specific task collaboratively. In a non-limiting example, cluster may be configured to scan a slide 122 and generate an image of the microscope slide. In some cases, cluster may include a plurality of clusters. As a non-limiting example, processor 102 may be configured to receive sensor data 112 from each sensor 110 of a scanner 120 in five clusters or any numbers of clusters.

With continued reference to FIG. 1, in some embodiments, scanner 120 includes a stage configured to hold slide 122. As used in this disclosure, a "stage" is a flat platform (i.e., an even surface without significant bumps, depressions, or curvatures) on which slide or specimen is placed for examination. In some cases, stage may include a slide port having one or more alignment features, wherein the "alignment features" are physical features that help to secure received slide in place and/or align a slide with another component of a scanner. In some embodiments, alignment features may include a component which keeps slide secure, such as a clamp, latch, clip, recessed area, or another fastener. In some embodiments, stage allow for easy removal or insertion of slide. In some embodiments, stage may include a transparent surface through which light may travel. In some embodiments, slide may rest on and/or may be illuminated by light traveling through such a transparent surface of stage.

With continued reference to FIG. 1, in some embodiments, scanner 120 may include an optical assembly including a lens and an objective configured to capture images of a slide 122 positioned on a stage. For the purposes of this disclosure, a "lens" is one or more optical elements shaped to focus light. In some embodiments, lens may be part of a compound optical system, including fixed or variable focal length optics. In some embodiments, lens may be aligned along an optical axis extending vertically or obliquely relative to a slide surface. For the purposes of this disclosure, an "objective" is a component of an optical system positioned closest to a slide, comprising a set of precision-engineered lenses that gather light from the specimen and determine the resolution, magnification, and numerical aperture of the resulting image. In some embodiments objective may be mounted on a vertically adjustable turret or optical housing. In some embodiments objective may be interchangeable to allow for different magnification levels. In some embodiments, scanner 120 may include a stage configured to support and transport slide 122 beneath the objective during image acquisition. In some embodiments, stage may be motorized and movable along at least one of three orthogonal axes: the X-axis (horizontal lateral movement), the Y-axis (horizontal longitudinal movement), and the Z-axis (vertical movement toward or away from the objective). In some embodiments, stage movement may allow scanner 120 to sequentially position different regions of slide 122 into the field of view of lens and objective for tiled imaging, continuous scan passes, or focus stacking. In some embodiments, relative motion between stage and optical system may enable fine alignment, autofocus, and high-throughput scanning. For example, and without limitation, while lens and objective remain fixed in position, stage may move in precise increments beneath them to scan across the entire surface of slide 122. In other embodiments, objective may be vertically adjustable (e.g., via piezo-driven Z-stages) to achieve dynamic focusing while stage remains stationary in the Z-direction.

With continued reference to FIG. 1, memory 108 contains instructions configuring processor 102 to receive sensor data 112 from one or more sensors 110. For the purposes of this disclosure, "sensor data" is data obtained from one or more sensors. As a non-limiting example, sensor data 112 may include image data 116, force measurements, torque values, positional feedback, displacement vectors, orientation data, or other physical measurements relevant to the status or condition of scanner 120 or slide 122. In some embodiments, sensor data 112 may be acquired from optical sensors 114, force-torque sensors 118, inertial measurement units, or environmental sensors (e.g., temperature sensor, moisture sensor, and the like). In some embodiments, sensor data 112 may be represented in analog or digital form and may include raw or pre-processed signals. In some embodiments, sensor data 112 may be timestamped, spatially correlated, or indexed to specific stages of a scanning operation. In some embodiments, sensor data 112 may be continuously streamed, polled at defined intervals, or event-triggered, and may be transmitted to processor 102 via wired or wireless communication interfaces.

With continued reference to FIG. 1, sensor data 112 includes image data 116 associated with at least a slide 122 placed on at least a scanner 120. As used in this disclosure, "image data" is information representing at least a physical scene, space, and/or object. In some cases, image data 116 may be generated by a camera or optical sensor 114. "Image data" may be used interchangeably through this disclosure with "image," where image is used as a noun. An image may be optical, such as without limitation where at least an optic is used to generate an image of an object (e.g., slide 122). An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. As a non-limiting example, image data 116 may include grayscale images, color images, depth maps, or multispectral image sets acquired in one or more frames. In some embodiments, image data 116 may represent physical characteristics, spatial orientation, or relative positioning of at least a slide 122 or a component of scanner 120. In some embodiments, image data 116 may be formatted as pixel arrays, vector maps, or compressed image files and may include metadata such as resolution, timestamp, exposure settings, and camera parameters.

With continued reference to FIG. 1, sensor data 112 includes a tactile datum. In some embodiments, processor 102 may receive tactile datum from a force-torque sensor 118. In some embodiments, force-torque sensor 118 may be positioned on a robotic arm. As used in this disclosure, a "tactile datum" refers to a piece of information that can be perceived through the sense of touch. In a non-limiting example, tactile datum may include textures, vibrations, temperature changes, and pressure differences. Without limitation, tactile datum may be used to convey information, represent data, or support decision-making processes through haptic feedback. In a non-limiting example, tactile datum may include textures, such as the difference between a smooth surface and a rough one, which could be detected by robotic arm to identify different materials. Additionally, tactile datum might encompass vibrations, allowing robotic arm to sense and respond to varying levels of oscillations when interacting with machinery. Temperature changes could also serve as tactile data, where robotic arm might perceive shifts in heat or cold to determine environmental conditions or the properties of an object. Furthermore, tactile datum could include pressure differences, enabling a robotic system to gauge the amount of force applied during tasks, ensuring precision and safety. Additionally, without limitation, tactile datum from force-torque sensor 118 may be used to ensure that effector of robotic arm applies a consistent and appropriate amount of force when picking up or placing slides, thereby enhancing the precision of robotic arm movements. Additional disclosure related to tactile datum and use of tactile datum to calibrate robotic arm may be found in U.S. patent application Ser. No. 18/866,242, filed on Apr. 8, 2024, entitled "APPARATUS AND METHOD FOR ADAPTIVE HANDLING OF SLIDES USING A ROBOTIC ARM," which is incorporated herein by reference in its entirety.

With continued reference to FIG. 1, in some embodiments, system 100 may include a scanner database 124. As used in this disclosure, "scanner database" is a data structure configured to store data associated with a scanner and a slide. In one or more embodiments, scanner database 124 may include inputted or calculated information and datum related to sensor data 112 and correction procedure 126. In some embodiments, a datum history may be stored in scanner database 124. As a non-limiting example, the datum history may include real-time and/or previous inputted data related to sensor data 112 and correction procedure 126. As a non-limiting example, scanner database 124 may include instructions from a user, who may be an expert user, a past user in embodiments disclosed herein, or the like, where the instructions may include examples of the data related to sensor data 112 and correction procedure 126.

With continued reference to FIG. 1, in some embodiments, processor 102 may be communicatively connected with scanner database 124. For example, and without limitation, in some cases, scanner database 124 may be local to processor 102. In another example, and without limitation, scanner database 124 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store scanner database 124. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, scanner database 124 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 102 may receive sensor data 112 from a remote device 128. For the purposes of this disclosure, a "remote device" is an external device to processor 102. Exemplary remote device 128 may include a computing device, processor, external device, and the like thereof. In some cases, remote device 128 may be communicatively connected to scanner 120. As a non-limiting example, scanners 120 or imaging devices may be communicatively coupled to processor 102 and/or remote device 128 using a network. As a non-limiting example, network may include one or more local area networks (LANs), wide area networks (WANs), wired networks, wireless networks, the Internet, or any network described in this disclosure. In a non-limiting example, scanners 120 may communicate with processor 102 over network using the TCP/IP protocol or other suitable networking protocols. As a non-limiting example, remote device 128 may include a laptop, desktop, tablet, mobile phone, smart phone, smart watch, kiosk, screen, smart headset, or things of the like. In some embodiments, remote device 128 may include an interface configured to receive inputs from a user. In some embodiments, user may manually input any data into system 100 using remote device 128. In some embodiments, user may have a capability to process, store or transmit any information independently.

With continued reference to FIG. 1, memory 108 contains instructions configuring processor 102 to detect a positional deviation 130 of at least a slide 122 in image data 116 relative to an alignment baseline 132. For the purposes of this disclosure, "positional deviation" is a measurable difference between an actual observed position of a slide and a predefined expected position, orientation, or geometry. As a non-limiting example, positional deviation 130 may include horizonal deviation, rotational deviation, vertical deviation, or a combination thereof. For the purposes of this disclosure, "horizontal deviation" refers to a linear displacement of at least a slide or scanner component along the X or Y axes relative to an alignment baseline. "Rotational deviation" refers to an angular displacement of the slide about an axis orthogonal to the scanning plane. "Vertical deviation" refers to a displacement along the Z-axis. In some embodiments, positional deviation 130 may include translational displacement along the X, Y, or Z axes, angular misalignment such as pitch, roll, or yaw, or a combination thereof. In some embodiments, processor 102 may be configured to evaluate features extracted from the image data 116 (e.g., edges, corners, centroids, or contours of slide 122) and compare them to reference features associated with alignment baseline 132. As a non-limiting example, if slide 122 appears laterally shifted by a predetermined number of pixels relative to its expected boundary in the image frame, this may constitute horizonal deviation (positional deviation 130). In some embodiments, processor 102 may identify rotational deviation (positional deviation 130) based on angular differences between detected orientation of slide 122 and the reference orientation encoded in alignment baseline 132.

With continued reference to FIG. 1, in some embodiments, positional deviation 130 may be associated at least one of a scanner misalignment 134 or a slide misalignment 136. For the purposes of this disclosure, a "scanner misalignment" is a condition in which one or more structural or optical components of a scanner deviate from their intended calibrated positions. In some embodiments, scanner misalignment 134 may arise from mechanical drift, thermal expansion, vibration, or external physical disturbances, and may affect the overall scan quality or alignment accuracy across all scanned slides 122. For the purposes of this disclosure, a "slide misalignment" is an incorrect placement or orientation of an individual slide on a scanner's stage or tray. In some embodiments, slide misalignment 136 may include lateral displacement, angular misalignment (e.g., skew or rotation), or elevation irregularities. In some embodiments, slide misalignment may be caused by imperfect delivery, non-uniform slide geometry (e.g., chipped corners or protruding labels), or user handling error. In some embodiments, processor 102 may be configured to differentiate between scanner misalignment 134 and slide misalignment 136 by analyzing consistency and characteristics of detected positional deviations 130 across multiple operations as described further in detail below.

With continued reference to FIG. 1, in some embodiments, positional deviation 130 may be associated with a chip or smudge in slide 122. In some embodiments, detecting positional deviation 130 may include determining a contaminant presence indicator. As used in this disclosure, a "contaminant presence indicator" is a metric, signal, or a set of data points derived from analyzing the captured slide image that suggests or confirms the presence of contaminant within optical path of imaging device, wherein the "contaminant" refers to any unwanted or foreign substance, particles, or material that potentially interfere with the clarity, quality, or accuracy of the captured image. In some embodiments, processor 102 may generate contaminant presence indicator by analyzing slide image for anomalies, inconsistencies, or patterns that are not expected to be part of the actual specimen or slide. In some cases, advanced image analysis algorithms, e.g., morphological operations (such as dilation, erosion, opening, or closing), Fourier Transform, scale invariant feature transform (SIFT), image segmentation, edge detection (such as Sobel, Canny, or Prewitt operators), among others may be used to detect and differentiate contaminant from captured slide image. In some cases, one or more machine learning processes, as described in further detail below may be incorporated into the analyzing process of slide image, for example, and without limitation, convolutional neural networks (CNN), support vector machines (SVM), random forests, and/or the like may be implemented, by processor 102, for contaminant detection and contaminant presence indicator generation as described herein.

Still referring to FIG. 1, in a non-limiting example, contaminant presence indicator or positional deviation 130 may include a binary output e.g., "TURE/POS (i.e., positive)" as "contaminant present" or "FALSE/NEG (i.e., negative)" as "contaminant is not present." In other cases, contaminant presence indicator may include more detailed metric indicating the type, size, density, location, or any other relevant information of detected contaminant. Contaminant presence indicator may be generated as a function of one or more data points describing pixel anomalies (i.e., areas in slide image where pixel values deviate significantly from surrounding areas), blurry regions (i.e., parts of slide image that are unexpectedly out of focus due to contaminants on the lens or slide 122), shadow or dark spots, reflective or shiny spots, and/or the like. Additionally, or alternatively, processor 102 may implement one or more pattern recognition algorithms configured to recognize common contaminant patterns, such as, without limitation, swirls of fingerprints or random scatter of dust particles. Contaminant presence indicator may then be generated, by processor 102 based on one or more contaminant patterns.

With continued reference to FIG. 1, in an embodiment, contaminant presence indicator may include a datum representing a contamination area. A "contamination area," for the purpose of this disclosure, refers to a specific region or zone wherein contaminant e.g., foreign particles, residues, or other unwanted materials are present. In such an embodiment, processor 102 may be configured to locate contamination area using one or more image processing and analysis algorithms or techniques as described herein. In some cases, irregularities, discolorations, or anomalies of captured slide image may indicate a presence of one or more contaminants, and therefore, may yield a positive output. In a non-limiting example, optical sensor 114 may capture a reference slide image when optical path is known to be clean. Additional disclosure related to methods of slide locking may be found in U.S. patent application Ser. No. 18/382,345, filed on Oct.

20, 2023, entitled "SYSTEM AND METHODS FOR DETECTING AND CLEANING CONTAMINANTS FROM AN IMAGING OPTICAL PATH," which is incorporated herein by reference in its entirety.

With continued reference to FIG. 1, for the purposes of this disclosure, an "alignment baseline" is a reference representing the correct spatial positioning or alignment of a slide. In some embodiments, alignment baseline 132 may be defined using image coordinates, physical dimensions, geometric templates, or calibration data obtained during system setup or derived from prior scan operations. In some embodiments, comparison between image data 116 and alignment baseline 132 may be performed using image processing algorithms, computer vision techniques, or statistical pattern matching as described further in detail below. In some embodiments, alignment baseline 132 may be a predefined spatial reference model that represents correct or intended position and orientation of at least a slide 122 or scanner 120 within a coordinate system of a scanning apparatus. In some embodiments, alignment baseline 132 may be expressed in terms of geometric coordinates, vector alignments, edge boundaries, or feature locations within a digital image frame. As a non-limiting example, alignment baseline 132 may define expected location of four corners of a slide 122 when properly placed on a scanner stage, or a central alignment axis of an optical scan path. In some embodiments, alignment baseline 132 may incorporate dimensional thresholds to define the allowable range of positional variation (e.g., ±0.5 mm offset or ±2 degrees of rotation). In some embodiments, alignment baseline 132 may be static, such as a fixed reference template stored in memory. In some embodiments, alignment baseline 132 may be dynamic, such as a continuously updated model derived from averaged historical scan data or real-time calibration routines. In some embodiments, alignment baseline 132 may be stored in scanner database 124 and processor 102 may retrieve alignment baseline 132 from scanner database 124. In some embodiments, user may manually input alignment baseline 132.

With continued reference to FIG. 1, in some embodiments, determining positional deviation 130 may include determining the positional deviation 130 as a function of a difference between at least one boundary and a reference boundary of alignment baseline 132. For the purposes of this disclosure, a "reference boundary" refers to a predefined or expected geometric configuration that represents the ideal or correct position and orientation of a slide within the scanner's coordinate system. In some embodiments, reference boundary may be stored in memory 108 or scanner database 124 as a set of coordinates, dimensions, or shape models representing correct spatial alignment of slide 122.

With continued reference to FIG. 1, in some embodiments, image data 116 and alignment baseline 132 may be analyzed using a field coordinate system. A "field coordinate system," as used herein is a coordinate system of an image of a physical space. As a non-limiting example, field coordinate system may include a Cartesian coordinate system, a polar coordinate system, or the like. In other words, a position of slide 122 within a field coordinate system may be static unless slide 122 is moved. In some embodiments, field coordinate system may include a three-dimensional coordinate system. In some embodiments, origin point of the field coordinate system may be selected, without limitation, for convenience of calculation, such as selection of a pixel on image data 116 may include without limitation an origin point on a coordinate system of the image data 116.

With continued reference to FIG. 1, in some embodiments, image data 116 may be analyzed using an image processing module 138. As used in this disclosure, an "image processing module" is one or more distinct image processing technique designed to perform specific processing tasks and or operations to a digital image. For example, and without limitation, image processing module 138 may be configured to compile plurality of digital images to create an integrated image. In an embodiment, image processing module 138 may include a plurality of software algorithms that can analyze, manipulate, or otherwise enhance an image, such as, without limitation, a plurality of image processing techniques as described below. Image processing module 138 may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above. In a non-limiting example, image processing module 138 may include any combination of image processing module 138. In some cases, image processing module 138 may be implemented with one or more image processing libraries such as, without limitation, OpenCV, PIL/Pillow, ImageMagick, and the like. Image processing module 138 may include, be included in, or be communicatively connected to processor 102, and/or memory 108.

With continued reference to FIG. 1, in an embodiment, processing images may include determining a degree of quality of depiction of a region of interest of an image or a plurality of images. In an embodiment, image processing module 138 may determine a degree of blurriness of images. In a non-limiting example, image processing module 138 may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module 138 may be configured to rank images according to degree of quality of depiction of a region of interest and select a highest-ranking image from a plurality of digital images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, image processing module 138 may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module 138, by averaging or filtering out pixel values in neighborhood of each pixel of an image to reduce random variations.

With continued reference to FIG. 1, in another embodiment, image processing module 138 may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,877,215 in a 24-bit color image. In some cases, contrast enhancement operation may include, without limitation, histogram equalization, adaptive histogram equalization (CLAHE), contrast stretching, and/or the like. Image processing module 138 may be configured to adjust the brightness and darkness levels within an image to make a feature more distinguishable (i.e., increase degree of quality of depiction). Additionally, or alternatively, image processing module 138 may be configured to perform a brightness normalization operation to correct variations in lighting conditions (i.e., uneven brightness levels). In some cases, an image may include a consistent brightness level across a region after brightness normalization performed by image processing module 138. In a non-limiting example, image processing module 138 may perform a global or local mean normalization, where the average intensity value of an entire image or region of an image may be calculated and used to adjust the brightness levels.

With continued reference to FIG. 1, in other embodiments, image processing module 138 may be configured to perform a color space conversion operation to increase degree of quality of depiction. In a non-limiting example, in case of a color image (i.e., RGB image), image processing module 138 may be configured to convert RGB image to grayscale or HSV color space. Such conversion may emphasize the differences in intensity values between a region or feature of interest and the background. Image processing module 138 may further be configured to perform an image sharpening operation such as, without limitation, unsharp masking, Laplacian sharpening, high-pass filtering, and/or the like. Image processing module 138 may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image processing techniques. Images may include highest-ranking image selected by image processing module 138 as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module 138 to enhance the edges of objects, remove noise, or fill gaps in a region or feature of interest before further processing.

With continued reference to FIG. 1, in an embodiment, isolating a region or feature of interest or a boundary from an image may include utilizing an edge detection technique, which may detect one or more shapes and/or position of slide 122 defined by edges. For the purposes of this disclosure, a "boundary" refers to a visually or geometrically identifiable edge, contour, or limit of a slide. In some embodiments, boundary of slide 122 may include one or more linear or curved segments corresponding to the perimeter of the slide 122, such as the top, bottom, left, and right edges, as well as corners or chamfers, if present. In some embodiments, boundary may be defined by regions of sharp contrast between slide 122 and underlying stage or background, which may be detected using edge detection algorithms, segmentation techniques, or shape-fitting processes. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module 138, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

With continued reference to FIG. 1, in a non-limiting example, identifying one or more features from image data 116 may include isolating one or more areas of interests using one or more edge detection techniques. An area of interest may include a specific area within a digital image that contains information relevant to further processing, such as one or more image features. In a non-limiting example, image data located outside an area of interest may include irrelevant or extraneous information. Such portion of image data 116 containing irrelevant or extraneous information may be disregarded by image processing module 138, thereby allowing resources to be concentrated at a targeted area of interest. In some cases, the area of interest may vary in size, shape, and/or location within image data 116. In a non-limiting example the area of interest may be slide 122 or tissue sample within slide 122. In some cases, the area of interest may specify one or more coordinates, distances, and the like. Image processing module 138 may then be configured to isolate the area of interest from image data 116 based on the particular feature.

With continued reference to FIG. 1, image processing module 138 may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module 138 may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module 138 may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module 138 as feature of interest, while other components may be discarded. Image processing module 138 may be further configured to extract feature of interest from an image for further processing. One or more image data 116 may be transmitted from processor 102 to image processing module 138 via any suitable electronic communication protocol, including without limitation packet-based protocols such as transfer control protocolinternet protocol (TCP-IP), file transfer protocol (FTP) or the like. Receiving images may include retrieval of image data 116 from a data store containing images as described below; for instance, and without limitation, images may be retrieved using a query that specifies a timestamp that images may be required to match.

With continued reference to FIG. 1, in some embodiments, processor 102 may be configured to analyze image data 116 using machine vision system. For the purposes of this disclosure, a "machine vision system" is a type of technology that enables a computing device to inspect, evaluate and identify still or moving images. In some cases, a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, in some embodiments, processor 102 may be configured to generate deviation training data 140. In a non-limiting example, deviation training data 140 may include correlations between exemplary sensor data, exemplary image data, exemplary tactile data, exemplary alignment baselines and/or exemplary positional deviations. In some embodiments, deviation training data 140 may be stored in scanner database 124. In some embodiments, deviation training data 140 may be received from one or more users, scanner database 124, external computing devices, and/or previous iterations of processing. As a non-limiting example, deviation training data 140 may include instructions from a user, who may be an expert user, a past user in embodiments disclosed herein, or the like, which may be stored in memory and/or stored in scanner database 124, where the instructions may include labeling of training examples. In some embodiments, deviation training data 140 may be updated iteratively on a feedback loop. As a non-limiting example, processor 102 may update deviation training data 140 iteratively through a feedback loop as a function of sensor data 112, image data 116, alignment baseline 132, positional deviation 130, or the like. In some embodiments, processor 102 may be configured to generate a deviation machine-learning model 142. In a non-limiting example, generating deviation machine-learning model 142 may include training, retraining, or fine-tuning deviation machine-learning model 142 using deviation training data 140 or updated deviation training data 140. In some embodiments, processor 102 may be configured to detect positional deviation 130 in image data 116 using deviation machine-learning model 142 (i.e. trained or updated deviation machine-learning model 142). In some embodiments, generating training data and training machine-learning models may be simultaneous.

With continued reference to FIG. 1, in some embodiments, processor 102 may be configured to differentiate between scanner misalignment 134 and slide misalignment 136 by analyzing consistency and characteristics of detected positional deviations 130 across multiple operations or historical positional deviations. In some embodiments, processor 102 may be configured to identify a type of positional deviation 130 (e.g., scanner misalignment 134 and slide misalignment 136) as a function of deviation patterns 144 of historical positional deviations. For the purposes of this disclosure, a "deviation pattern" is a recurring arrangement of one or more attributes of positional deviations. In some embodiments, deviation pattern 144 may be associated with positional deviation 130 observed over a defined time interval or across multiple scanning operations. As a non-limiting example, deviation patterns 144 may be associated with directional consistency, frequency, magnitude range, spatial distribution, or temporal persistence. As a non-limiting example, a deviation pattern 144 may include a consistent horizontal shift of 1.5 mm to the left across a series of scans, repeated angular misalignments of 3 degrees counterclockwise, or fluctuating Z-axis offsets occurring intermittently after mechanical vibration events. In some embodiments, processor 102 may record and evaluate a plurality of positional deviations 130 and associated metadata obtained from image data 116 or sensor data 112 during sequential or repeated scanning operations. In some embodiments, processor 102 may be configured to store and analyze historical records of positional deviations 130 (historical positional deviations), and extract deviation patterns 144. In some embodiments, deviation pattern 144 may be used as a diagnostic indicator to distinguish between scanner misalignment 134 and slide misalignment 136. For example, and without limitation, a uniform and persistent deviation pattern 144 across multiple slide scans may be identified as indicative of scanner misalignment 134. For example, and without limitation, inconsistent or isolated deviation patterns 144 may indicate individual slide misalignment 136.

With continued reference to FIG. 1, in some embodiments, processor 102 may determine or generate a deviation vector based on positional features extracted from image data 116 relative to alignment baseline 132. For the purposes of this disclosure, a "deviation vector" is a mathematical representation of the displacement between an observed position of at least a slide and its expected position. As a non-limiting example, deviation vector may include one or more components, such as direction, magnitude, and the like. In a non-limiting example, processor 102 may receive image data 116 from an optical sensor 114 capturing position and orientation of a slide 122 placed on scanner 120 and using image processing techniques such as edge detection, contour tracing, or fiducial marker recognition, processor 102 may extract positional features of the slide 122, including its centroid coordinates, corner positions, or orientation angle. These observed features may then be compared against corresponding reference features of alignment baseline 132. Continuing the non-limiting example, the result of this comparison may generate a deviation vector, where the direction corresponds to the axis or orientation of displacement (e.g., left/right, forward/backward, rotated clockwise), the magnitude quantifies the amount of offset (e.g., in millimeters or degrees), and a type of deviation categorizes the nature of positional deviation 130 (e.g., translational, rotational, or vertical). For example, and without limitation, if a slide 122 is detected to be 1.2 mm to the left and rotated 2 degrees counterclockwise from the expected position (alignment baseline 132), processor 102 may generate a deviation vector including those two components. In some embodiments, deviation vector may be expressed in a multidimensional format (e.g., a three-element vector $[\Delta x, \Delta y, \theta]$) or as separate scalar values tagged with directional and contextual metadata. In some embodiments, processor 102 may store each deviation vector along with a timestamp and scan identifier, enabling pattern analysis across multiple operations. In some embodiments, consistent deviation vectors with similar directional and magnitude characteristics may be used to identify a type of positional deviation 130 (e.g., scanner misalignment 134), while variable or isolated vectors may indicate slide misalignment 136. For example, and without limitation, if all slides 122 appear shifted to the left by approximately the same amount in every scanning operation, it may suggest that imaging optics or mechanical stage of scanner 120 is misaligned relative to alignment baseline 132. For example, and without limitation, one slide 122 may exhibit rotational skew, while another may be laterally offset, and a third correctly aligned, suggesting that scanner 120 is properly calibrated but the slide placement process is inconsistent.

With continued reference to FIG. 1, in some embodiments, processor 102 may be configured to spatially align tactile datum to image data 116 to detect positional deviation 130. For the purposes of this disclosure, "spatial alignment" of tactile datum to image data refers to a geometric positioning and orientation of a tactile datum within a coordinate system associated with image data. In some embodiments, processor 102 may temporally align tactile datum to image data 116 before spatially algin tactile datum to image data 116. For the purposes of this disclosure, "temporal alignment" refers to a synchronization of data acquired from two or more sensors or system components with respect to time. As a non-limiting example, temporal alignment may ensure that image data 116 and tactile datum are accurately associated with a same phase of slide handling or scanning process. In a non-limiting example, temporal alignment may include associating images (image data XXX) with synchronized force-torque measurements (tactile datum) during the same scan operation or time window. For example, and without limitation, each image of image data XXX may be timestamped and indexed, as are a tactile datum. In some embodiments, processor 102 may analyze image data 116 and tactile datum corresponding to a same operational phase. As a non-limiting example, operational phase may include slide loading, settling, scanning, post-scan or pre-scan alignment. In some embodiments, spatial alignment may include mapping visual features extracted from image data 116 or positional deviation 130 determined by comparing image data 116 with alignment baseline 132 to mechanical forces or torques detected on corresponding axes. For example, and without limitation, a leftward shift (positional deviation 130) of slide 122 in image data 116 may be expected to correlate with a positive X-axis force reading (tactile datum) on force-torque sensor 118. For example, and without limitation, rotational deviation (positional deviation 130) detected in image data 116 may correspond to a torque around the Z-axis in tactile datum. In some embodiments, spatially aligning tactile datum to image data 116 may include mapping image data 116 into coordinate system and aligning tactile datum into the mapped image data. In some embodiments, spatially aligning tactile datum to image data 116 may increase confidence of positional deviation 130. As a non-limiting example, if image data 116 indicates that the bottom-left corner of slide 122 is elevated (e.g., tilt or vertical misplacement), and force-torque sensor 118 concurrently detects increased torque or unbalanced force distribution on that corner, processor 102 may confirm positional deviation 130 with high confidence.

With continued reference to FIG. 1, memory 108 contains instructions configuring processor 102 to determine whether positional deviation 130 is within a predefined correction threshold 146. For the purposes of this disclosure, a "correction threshold" is a limit or range against which a positional deviation is compared to determine whether a scanning operation needs a correction procedure. As a non-limiting example, correction threshold 146 may include a limit or range associated with linear displacement (e.g., +1.0 mm), angular rotation (e.g., +2.0 degrees), or any combination thereof. In some embodiments, correction threshold 146 may be fixed or defined during system calibration. In some embodiments, correction threshold 146 may be dynamically updated based on environmental conditions (sensor data 112 from environmental sensor [temperature sensor, moisture sensor, and the like]), scanner performance history, and the like. For example, and without limitation, a correction threshold 146 may include maximum allowable positional deviation 130 of +1.0 millimeter in any horizontal direction (X or Y axis) and +1.5 degrees of rotational misalignment about the Z-axis, and processor 102 may determine whether a linear displacement of a slide's center point from its expected position is within the 1.0 mm range (correction threshold 146), and whether detected angular orientation of the slide 122 is within 1.5 degrees by analyzing deviation vector. In some embodiments, correction threshold 146 may be stored in scanner database 124 and processor 102 may retrieve correction threshold 146 from scanner database 124. In a non-limiting example, processor 102 may use correction threshold 146 that is used in previous data iterations. In some embodiments, user may manually input correction threshold 146.

With continued reference to FIG. 1, memory 108 contains instructions configuring processor 102 to initiate a correction procedure 126 associated with at least a slide 122. For the purposes of this disclosure, a "correction procedure" is a set of actions to correct a positional deviation. In some embodiments, correction procedure 126 may be configured to realign a position or orientation of at least a slide 122 to conform to alignment baseline 132. In some embodiments, correction procedure 126 may vary depending on a type, direction, and magnitude of positional deviation 130. As a non-limiting example, correction procedure 126 may include translating a slide laterally, rotating it to correct angular misalignment, or adjusting vertical position. In some embodiments, correction procedure 126 may be initiated by a processor 102 in response to determining that positional deviation 130 falls within a correction threshold 146. In some embodiments, correction procedure 126 may be executed autonomously by processor 102 without requiring manual intervention. In some embodiments, correction procedure 126 may be executed manually by a user. In some embodiments, user may manually input or determine correction procedure 126.

With continued reference to FIG. 1, initiating correction procedure 126 includes generating a correction datum 148 if positional deviation 130 is within correction threshold 146. For the purposes of this disclosure, a "correction datum" is a data element indicating a correction action for a positional deviation. As a non-limiting example, correction datum 148 may include one or more parameters representing translational offsets along the X, Y, or Z axes, rotational adjustments around one or more axes, timing values for movement initiation or duration, actuator control signals 150, or identifiers for pre-programmed alignment routines. As another non-limiting example, correction datum 148 may include a slide identifier. In some embodiments, correction datum 148 may include magnitude and direction of required adjustment or correction. As a non-limiting example, correction datum 148 may be formatted as a numerical vector, a command packet, or a lookup reference to a predefined movement routine stored in memory 108 or scanner database 124. For example, and without limitation, correction datum 148 may instruct a slide stage actuator to move the slide 0.7 mm to the right and rotate it 1.2 degrees clockwise. In some embodiments, processor 102 may transmit correction datum 148 to one or more physical alignment mechanisms (e.g., linear actuators, servo motors, or piezoelectric stages) capable of executing correction datum 148. In a non-limiting example, if deviation vector is within correction thresholds 146, positional deviation may be considered correctable, and processor 102 may initiate a correction procedure 126 to realign slide 122.

With continued reference to FIG. 1, in some embodiments, generating correction datum 148 may include executing correction datum 148 by generating and transmitting an actuator control signal 150 to reposition at least a slide 122 to be aligned with alignment baseline 132. For the purposes of this disclosure, an "actuator control signal" is a signal for one or more actuators to command a specific physical movement or mechanical action. In some embodiments, actuator control signal 150 may encode motion instructions derived from a correction datum 148, and may be used to reposition at least a slide 122 or scanner component in response to positional deviation 130. In some embodiments, actuator control signal 150 may include parameters such as displacement distance (e.g., linear travel in millimeters), angular rotation (e.g., degrees or radians), motion direction, velocity, acceleration profile, dwell time, or actuation mode. As a non-limiting example, actuator control signal 150 may instruct a linear actuator to move 0.9 mm along the X-axis at a speed of 5 mm/s, or a rotary actuator to rotate the slide stage 1.5 degrees clockwise. In some embodiments, actuator may receive and interpret the actuator control signal 150 and execute the motion. For the purposes of this disclosure, an "actuator" is a component of a machine that is responsible for moving and/or controlling a mechanism or system. Actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or human power. In some cases, actuator may have an energy or power source other than control signal. This may include a main energy source, which may include for example electric power, hydraulic power, pneumatic power, mechanical power, and the like. In some cases, upon receiving a control signal, actuator may respond by converting source power into mechanical motion. In some cases, actuator may be understood as a form of automation or automatic control.

With continued reference to FIG. 1, in some embodiments, actuator control signal 150 may include a calibration procedure including adapted pick waypoint and adapted place waypoint. As used in this disclosure, a "calibration procedure" is a systematic series of commands designed to set or adjust the accuracy of an actuator's performance parameters to ensure precision and consistency in its operation. In some embodiments, calibration procedure may include one or more waypoints such as, as non-limiting examples, pick waypoints and place waypoints. In a non-limiting example, the calibration procedure may involve comparing a device's outputs with a known standard or set of standards and making the requisite adjustments to align the device's outputs with the established waypoints. As used in this disclosure, a "waypoint" is a reference point in physical space used for purposes of navigation. In a non-limiting example, waypoints may be used in sequence to outline a predetermined course or to mark locations of interest. In another non-limiting example, generating waypoints may involve recording the three-dimensional position (i.e., Px, Py, Pz coordinates) and orientation (i.e., Rx, Ry, Rz coordinates) of effector of robotic arm as robotic arm moves through space. For example, without limitation, processor 102 may receive calibration procedure generated using plurality of waypoints, where each waypoint marks a specific reference point in physical space. In a non-limiting example, calibration procedure may involve robotic arm recording its three-dimensional position and orientation at each waypoint of plurality of waypoints, allowing processor 102 to adjust the arm's movements for precise and consistent operation.

Still referring to FIG. 1, in some embodiments, processor 102 may control at least a robotic arm as a function of calibration procedure, wherein calibration procedure may be configured to cause robotic arm to pick, using pick waypoint of plurality of waypoints, and place, using a place waypoint of the plurality of waypoints, a slide. As used in this disclosure, an "adapted place waypoint" is a refined waypoint position where a slide is to be placed for analysis or observation. In a non-limiting example, adapted place waypoint may be specifically designed to correspond with the optimized slide pose and dimensions, ensuring that slide 122 is correctly oriented and positioned for the intended imaging or observation task. In a non-limiting example, adapted place waypoint is configured to interact with the slide holder and the imaging system to facilitate precise placement and alignment of the glass slide. For example, without limitation, adapted place waypoint may include a marked area on the slide holder that indicates the exact location where a slide of standard dimensions is to be placed. As used in this disclosure, an "adapted pick waypoint" is a refined position that has been customized or configured for the specific purpose of guiding a picking mechanism or entity to a location where an item is to be picked up. In a non-limiting example, adapted pick waypoint may include a waypoint has been adjusted or tailored based on factors such as the type of item, the environment in which the picking will occur, or the capabilities of the picking mechanism. Additional disclosure related to adapted pick waypoint and adapted place waypoint may be found in U.S. patent application Ser. No. 18/866,242, filed on Apr. 8, 2024, entitled "APPARATUS AND METHOD FOR ADAPTIVE HANDLING OF SLIDES USING A ROBOTIC ARM," which is incorporated herein by reference in its entirety.

With continued reference to FIG. 1, in some embodiments, actuator control signal 150 may be configured to control a dynamic securing element and/or static securing element of interacting device or robotic arm to securely hold slide 122. For the purposes of this disclosure, a "static securing element" is an element that is configured to securely hold a slide in position by applying a pressure but does not change its position with respect to system. Static securing element may be implemented using any suitable means as recognized by a person of ordinary skill in the art upon revieing the entirety of this disclosure. As a nonlimiting example, static securing element may be implemented by creating one or more ridges or the like that protrude out of/elevates from a planar surface of a stage, thereby blocking slide 122 from sliding or dislocating out of the stage. As another nonlimiting example, static securing element may include one or more sidewalls in transverse directions that prevent slide 122 from sliding or dislocating. For the purposes of this disclosure, a "dynamic securing element" is an element that is configured to securely hold a slide in position by applying a pressure and does so by changing its position. Dynamic securing element may be configured to toggle between multiple configurations, such as between a first, engaged configuration and a second, disengaged configuration. In some cases, dynamic securing element may be referred to as a "pusher". Dynamic securing element may be configured to contact slide 122 at a second pair of orthogonal, intersecting edges of the slide 122 diagonally opposite the first pair of orthogonal, intersecting edges of the microscopy slide. Specifically, slide 122 of a rectangular prism geometry may have four sides; static securing element may be in contact with a first side and a second side that are connected to each other at a right angle, and accordingly, dynamic securing element may be in contact with a third side and a side that are connected to each other at a right angle. Such design enables static securing element and dynamic securing element to apply force or pressure to microscopy in opposing directions, thereby holding it in place within stage. In some embodiments, dynamic securing element and any portion or element may be maneuvered either by hand or using mechanical means such as an actuator. Additional disclosure related to methods of slide locking may be found in U.S. patent application Ser. No. 18/382,345, filed on Oct. 20, 2023, entitled "SYSTEM AND METHODS FOR DETECTING AND CLEANING CONTAMINANTS FROM AN IMAGING OPTICAL PATH," which is incorporated herein by reference in its entirety. In some embodiments, actuator control signal 150 may be configured to use force feedback (tactile datum) in robotic arm to calibrate placement of slides 122.

With continued reference to FIG. 1, in some embodiments, generating correction datum 148 may include identifying a type of positional deviation 130 as a function of deviation patterns 144 of historical positional deviations and generating correction datum 148 as a function of the type of the positional deviation 130. As a non-limiting example, a type of positional deviation 130 may include scanner misalignment 134 and slide misalignment 136. As another non-limiting example, a type of positional deviation 130 may include translational misalignment, rotational misalignment, vertical displacement, scanner misalignment, or slide misalignment. For instance, and without limitation, correction datum 148 for a translational slide misalignment may involve linear repositioning along one or more axes. For instance, and without limitation, correction datum 148 for a rotational deviation may involve angular realignment.

With continued reference to FIG. 1, initiating correction procedure 126 includes generating a deviation flag 152 if positional deviation 130 exceeds correction threshold 146. For the purposes of this disclosure, a "deviation flag" is a data structure, signal, or system alert that indicates that detected positional deviation is beyond the range of correction threshold. In some embodiments, processor 102 may compare positional deviation 130 with a correction threshold 146 and if the positional deviation 130 exceeds one or more threshold parameters of the correction threshold 146, processor 102 may determine that positional deviation 130 falls outside the bounds of safe or effective automated correction. In some embodiments, processor 102 may generate a deviation flag 152 to log the event and optionally trigger an appropriate response. As a non-limiting example, generating the deviation flag may trigger halting scanning operation, generating a user notification using a user interface 156, logging the condition in a correction data structure 158, or initiating a failsafe protocol to prevent damage to the scanner 120 or specimen. In a non-limiting example, if a slide is found to be misaligned by 2.5 mm when correction threshold 146 is defined as +1.0 mm, processor 102 may generate a deviation flag 152 indicating the type, magnitude, and time of positional deviation 130. In some embodiments, deviation flag 152 may be stored in memory 108 or scanner database 124 and associated with metadata such as the slide identifier (ID), scanner module ID, or environmental conditions at the time of positional deviation 130. In a non-limiting example, if positional deviation 130 exceeds correction threshold 146, processor 102 may generate a deviation flag 152 and/or disable scanning operations until it is resolved or corrected.

With continued reference to FIG. 1, in some embodiments, generating deviation flag 152 may include disabling scanning operations upon repeated generation of the deviation flag 152 exceeding a flag threshold count over a defined time interval. For the purposes of this disclosure, a "flag threshold count" is a numerical limit representing a maximum allowable number of deviation flag. In some embodiments, each time processor 102 detects a positional deviation 130 that exceeds correction threshold 146, a deviation flag 152 may be generated and recorded in memory 108 or scanner database 124. In some embodiments, processor 102 may monitor a frequency of deviation flags 152 over a defined time interval. As a non-limiting example, processor 102 may monitor a frequency of deviation flags 152 over a moving window of one minute, five minutes, or a configurable number of scan cycles. In a non-limiting example, if cumulative count of deviation flags 152 exceeds flag threshold count during the time interval, processor 102 may interpret this condition as indicative of a systemic fault, progressive scanner misalignment, repeated slide misplacement, or environmental instability affecting alignment integrity. Continuing the non-limiting example, processor 102 may disable scanning operations automatically to prevent further misaligned scans, protect system components, or avoid propagation of image or data quality issues. In some embodiments, disabling scanning operations may include halting slide movement, suspending image acquisition, notifying a user using a graphical user interface or user interface 156, or initiating diagnostic or recalibration routines. As a non-limiting example, if flag threshold count is set to three deviation flags 152 within a five-minute interval, and processor 102 generates a fourth deviation flag 152 during that window, processor 102 may disable further scanning tasks and prompt a user for manual inspection or maintenance.

With continued reference to FIG. 1, in some embodiments, generating deviation flag 152 may include performing a root sum square (RSS) analysis of positional deviation 130. For the purposes of this disclosure, "root sum square analysis" refers to a mathematical technique used to calculate a single composite deviation value based on the combination of multiple orthogonal positional deviation components. In some embodiments, positional deviation 130 may be represented as a multi-dimensional vector including individual deviation components, including but not limited to horizontal displacement, vertical displacement, and angular misalignment. In some embodiments, processor 102 may compute the root sum square of these components according to the following general formula: $RSS=\sqrt{(\Delta X^2+\Delta Y^2+\Delta\theta^2)}$, where $\Delta X$ and $\Delta Y$ represent linear displacements in millimeters along horizontal axes, and $\Delta\theta$ represents rotational deviation in degrees or radians. The RSS value provides a unified scalar metric that reflects the overall magnitude of misalignment, irrespective of its directional components. In some embodiments, processor 102 may compare the resulting RSS value against a predefined threshold (correction threshold 146). If the computed RSS exceeds the allowable limit, it indicates that the cumulative positional deviation 130 is too large for correction within system tolerance, and processor 102 may generate a deviation flag 152. As a non-limiting example, a slide 122 that is slightly misaligned in both X and Y directions, and also exhibits a small angular rotation, may individually have components below their respective thresholds (correction threshold 146). However, the combined RSS value may exceed the total allowable deviation magnitude, triggering the generation of a deviation flag 152.

With continued reference to FIG. 1, in some embodiments, processor 102 may be configured to generate a correction data structure 158 summarizing correction procedure 126 and generate a user interface 156 including correction data structure 158. For the purposes of this disclosure, a "correction data structure" is a record that documents information associated with one or more correction procedures. In some embodiments, correction data structure 158 may include details such as the number and types of positional deviations 130 detected, correction datum 148 generated for each event, outcome of each correction procedure 126, timestamps, deviation magnitudes, execution success or failure, and any deviation flags 152 issued during the operation. In some embodiments, correction data structure 158 may summarize statistical trends such as frequency of correction, cumulative deviation vectors, or recurring patterns indicative of scanner drift or wear.

With continued reference to FIG. 1, in some embodiments, processor 102 may be configured to generate a user interface 156 that displays correction data structure 158 in a format accessible to a technician, operator, or maintenance personnel. In some embodiments, user interface 156 may present the information as a graphical dashboard, a tabular log, or a downloadable report. In some embodiments, user interface 156 may include visual indicators such as color-coded status alerts, charts showing deviation trends, or real-time system health metrics. As a non-limiting example, user interface 156 may display a list of slides that required correction, the amount and direction of each correction, and a notification if the number of deviation flags 152 exceeded a correction threshold 146. In some embodiments, user interface 156 may allow a user to filter or export correction data structure 158, or initiate system diagnostics or recalibration based on the report's findings.

With continued reference to FIG. 1, for the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 102. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, processor 102 may be configured to record deviation metrics 160 over a plurality of scan operations, compare the recorded deviation metrics 160 to a defined statistical operating range 162 and generate a maintenance alert 164 based on a trend analysis of the recorded deviation metrics 160.

With continued reference to FIG. 1, in some embodiments, processor 102 may be configured to record deviation metrics 160 over a plurality of scan operations, compare the recorded deviation metrics 160 to a defined statistical operating range 162, and generate a maintenance alert 164 based on a trend analysis of the recorded deviation metrics 160. For the purposes of this disclosure, "deviation metrics" are quantifiable values that represent magnitude, frequency, direction, or classification of positional deviations detected during scan operations. As a non-limiting example, deviation metrics 160 may include quantifiable values related to translational displacement, angular misalignment, correction frequency, deviation vectors, or deviation flags 152 generated per slide 122 or per unit time. In some embodiments, processor 102 may store deviation metrics 160 in memory 108 or scanner database 124 for each scan operation, thereby creating a historical dataset of scanner alignment behavior. In some embodiments, processor 102 may compare the recorded deviation metrics 160 against a defined statistical operating range 162. For the purposes of this disclosure, a "defined statistical operating range" is expected or acceptable limits of a system performance. In some embodiments, defined statistical operating range may include expected or acceptable limits of a system performance based on calibration data, historical norms, or factory-defined tolerances. As a non-limiting example, defined statistical operating range 162 may be defined using parameters such as mean deviation values, standard deviations, upper and lower control limits, or confidence intervals. For example, and without limitation, defined statistical operating range 162 may be established using historical deviation data collected from 100 prior scan operations. In a non-limiting example, if processor 102 calculates that the average horizontal positional deviation (mean) is 0.4 mm, and the standard deviation is 0.1 mm, processor 102 may define defined statistical operating range 162 as +2 standard deviations from the mean, resulting in an acceptable range (defined statistical operating range 162) of 0.2 mm to 0.6 mm for horizontal positional deviation and any deviation metric 160 out of defined statistical operating range 162 may trigger trend-based diagnostics, be flagged for manual review or maintenance alert 164 generation. For the purposes of this disclosure, "trend analysis" refers to a process by which processor evaluates changes or patterns in prior system performance data 166 or deviation metrics over time in order to identify statistically significant directional behavior. In some embodiments, trend analysis may be used to detect gradual shifts, recurring anomalies, or progressive degradation in system alignment performance that may not be evident from isolated measurements. As a non-limiting example, trend analysis may include computational methods such as linear regression, moving average calculations, exponential smoothing, or other statistical or machine learning techniques designed to assess whether the frequency, magnitude, or type of positional deviations 130 is increasing, decreasing, or fluctuating beyond an expected range. In some embodiments, if statistically significant drift or anomaly is detected, processor 102 may generate a maintenance alert 164. As a non-limiting example, anomaly in the trend analysis may include repeated deviation metrics 160 approaching or exceeding the upper bounds of defined statistical operating range 162.

With continued reference to FIG. 1, in some embodiments, determining defined statistical operating range 162 may include determining a standard deviation of prior system performance data 166 and determining the defined statistical operating range 162 as a function of the standard deviation. For the purposes of this disclosure, "prior system performance data" is historical records of measurable parameters generated by a system 100 during previous scan operations. As a non-limiting example, system performance data 166 may include positional deviation metrics 160, correction data, actuator response times, deviation flag counts, system alignment statuses, correction success rates, and other operational indicators that reflect the scanner's alignment behavior, mechanical performance, and corrective response history. In some embodiments, prior system performance data 166 may be derived from sensor data 112, image analysis results, actuator logs, or internally generated system reports collected over a defined operational window. In some embodiments, prior system performance data 166 may be stored in scanner database 124. In some embodiments, user may manually input prior system performance data 166. For example, and without limitation, prior system performance data 166 may include values of the average translational correction magnitude per scan, the standard deviation of angular misalignment over the last 100 slides, or a frequency of deviation flag 152 generation during the last maintenance cycle. In some embodiments, processor 102 may compute statistical measures from prior system performance data 166 and defined statistical operating range 162 may then be established as a function of standard deviation, such as a range extending a specified number of standard deviations above and below the mean (e.g., +10, +20, or +30). As a non-limiting example, if the average positional deviation 130 is 0.5 mm and the standard deviation is 0.2 mm, defined statistical operating range 162 may be set from 0.1 mm to 0.9 mm (i.e., +20). Deviation metrics 160 that fall outside this range may be considered statistically significant anomalies.

With continued reference to FIG. 1, for the purposes of this disclosure, a "maintenance alert" is an indication to inform a user. In some embodiments, processor 102 may transmit maintenance alert 164 to remote device 128. In some embodiments, maintenance alert 164 may include audio, text, image, vibration, and the like. As a non-limiting example, maintenance alert 164 may include a software-based notification, graphical indicator, or logged message informing a user that scanner 120 or slide 122 may require inspection, recalibration, or preventive service. In some embodiments, maintenance alert 164 may include a text message, notification sound, phone call, notification banner, or the like. In some embodiments, maintenance alert 164 may be stored in structure database 124. In some embodiments, maintenance alert 164 may be retrieved from structure database 124.

Figure 2:
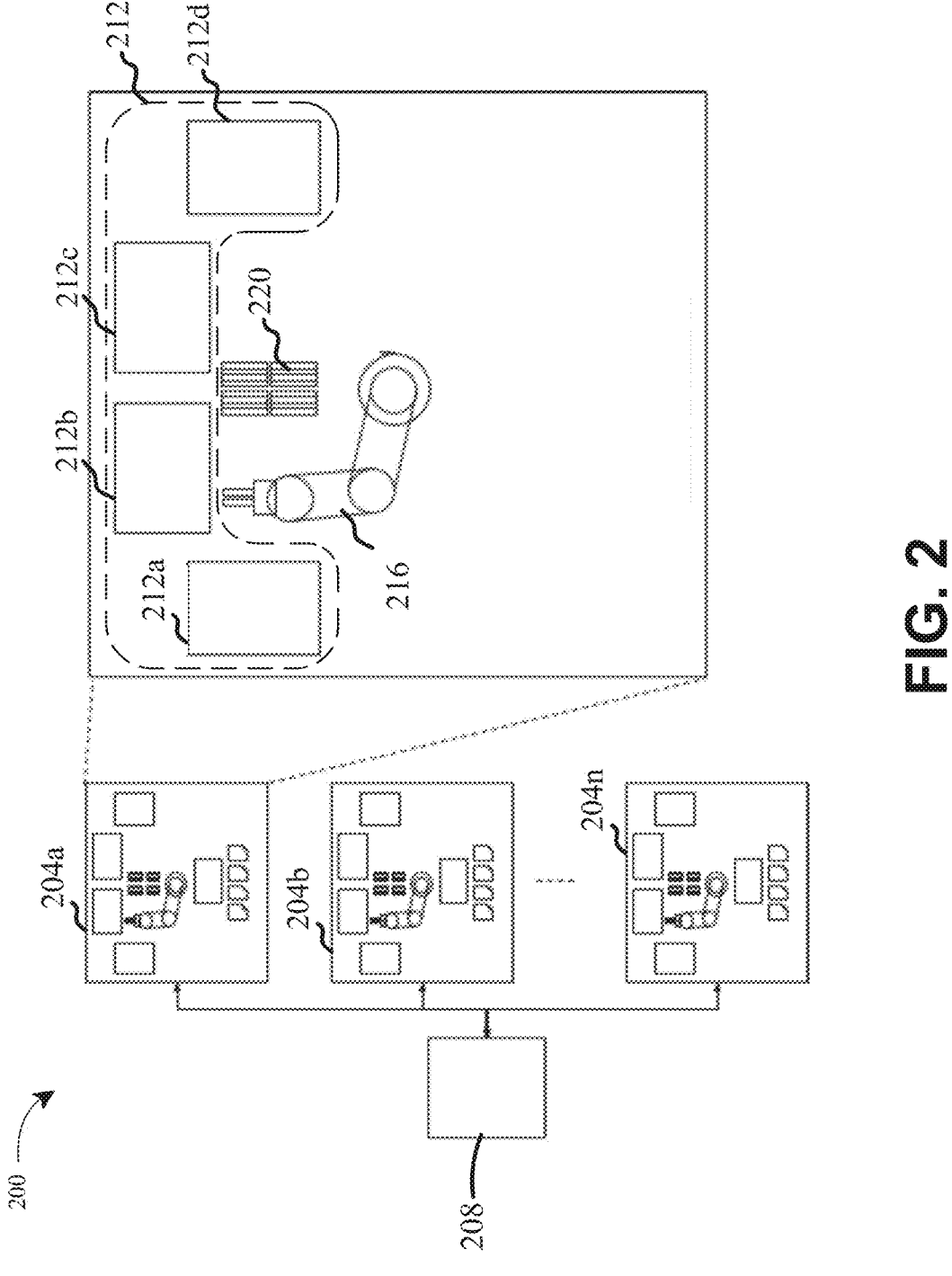
FIG. 2 illustrates a configuration of an exemplary system including a cluster of scanners.

Referring now to FIG. 2, a configuration of an exemplary system 200 including clusters 204a-n of scanners 212. System 200 includes processor 208. In a non-limiting example, processor 208 may include a plurality of processors. For example, and without limitation, processor 208 may include a cluster management system. In some cases, cluster management system and/or processor 208 may be configured to receive sensor data from sensors positioned on scanners 212a-d. In FIG. 2, cluster 204a is illustrated in detail. Cluster 204a includes four scanners 212a-d as shown in FIG. 2. Cluster 204 may include an interacting device 216. For the purposes of this disclosure, an "interacting device" is a device that interacts with a scanner to perform a specific task. Exemplary interacting device 216 may include a robotic arm. For the purposes of this disclosure, a "robotic arm" is a mechanical device or manipulator that mimics the structure and function of a human arm. In a non-limiting example, a robotic arm may pick up slide 220 from a first slide storage, carry the slide 220 to scanner 212 and place the slide 220 on the scanner 212. Then, continuing the non-limiting example, the robotic arm may pick the slide 220 from the scanner 212, carry the slide 220 to a second slide storage and drop the slide 220 off to the second slide storage. In a non-limiting example, a robotic arm may pick up a slide from a slide storage, carry the slide to scanner 212 and place the slide 220 on the scanner 212. Then, continuing the non-limiting example, the robotic arm may pick the slide 220 from the scanner 212, carry the slide 220 to the slide storage and drop the slide off to the slide storage. Processor 208 may be communicatively connected to interacting device 216 and/or cluster management system. Additional disclosure related to a cluster of scanners 212 may be found in U.S. patent application Ser. No. 18/638,959, filed on Dec. 13, 2013, entitled "APPARATUS AND METHOD OF HOT-SWAPPING A COMPONENT OF A COMPONENT UNIT IN A CLUSTER," which is incorporated herein by reference in its entirety.

Figure 3:
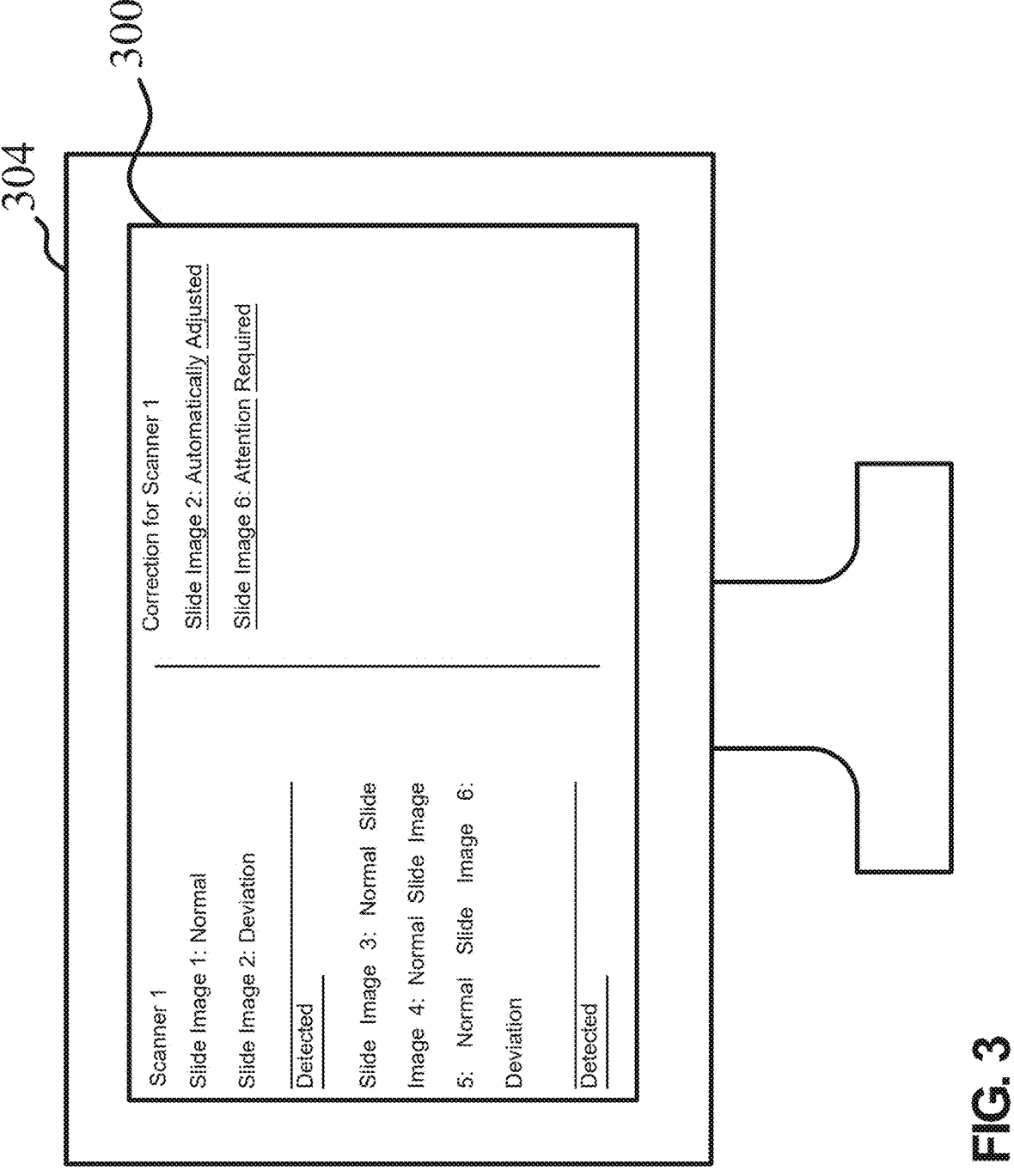
FIG. 3 illustrates an exemplary user interface.

Referring now to FIG. 3, an exemplary user interface 300 is illustrated. In some embodiments, user interface 300 may be presented on a display screen of a remote device 304. In a non-limiting example, user interface 300 may include a list of slide images for a scanner, where each entry corresponds to an individual slide image and its associated alignment status. For example, "Slide Image 1: Normal" indicates that no positional deviation was detected for the first slide, whereas "Slide Image 2: Deviation Detected" indicates that the second slide exhibited a positional deviation as determined by processor. In a non-limiting example, user interface 300 may include a list of correction procedures under a "Correction for Scanner 1" section, which summarizes correction procedures taken for slides with positional deviations. For example, "Slide Image 2: Automatically Adjusted" indicates that the positional deviation detected for Slide 2 was within the correction threshold, and a correction procedure was automatically initiated and successfully executed using correction datum and/or actuator control signal. For example, "Slide Image 6: Attention Required" indicates that the positional deviation for Slide 6 exceeded the correction threshold, which may result in the generation of a deviation flag and a recommendation for manual review or intervention. In some embodiments, entries on user interface 300 may be color-coded, hyperlinked, or interactive, allowing a user to access detailed correction data structures, historical deviation metrics 160, or real-time scanner health data. In some embodiments, user interface 300 may further include navigation tools, filters, or export functionality to support operational review and maintenance tracking.

Figures 4A, 4B, 4C:
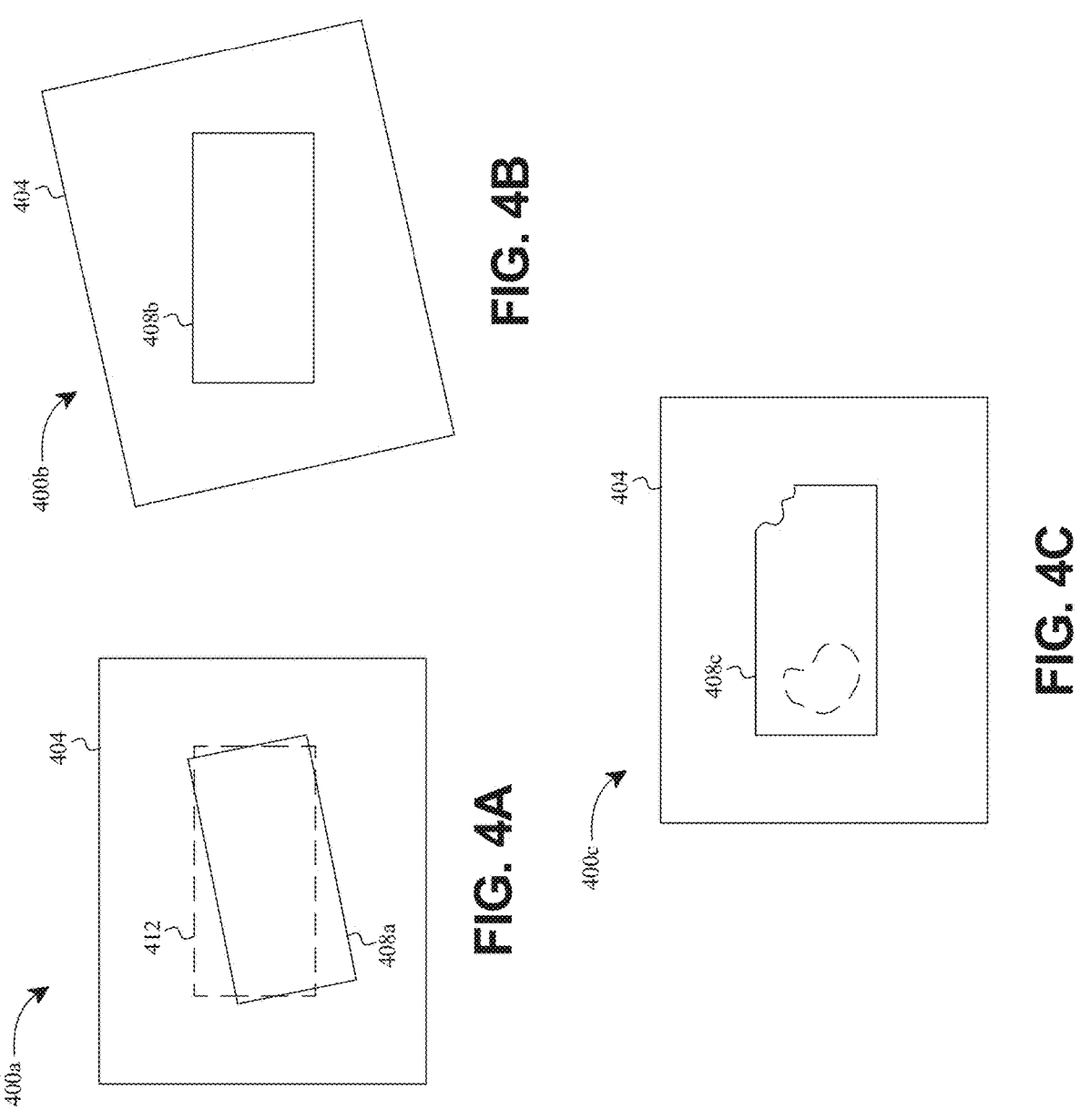
FIGS. 4A-C illustrate exemplary image data containing exemplary positional deviations.

Referring further to FIGS. 4A-C, exemplary image data 400a-c containing exemplary positional deviations are illustrated. In some embodiments, image data 400*a-c* may include stage 404. In some embodiments, image data 300*a-c* may include slide 408*a-c*, and processor may determine positional deviations based on alignment baseline 412. In some embodiments, alignment baseline 412 may represent a predefined reference boundary or coordinate frame within the field of view used by processor to evaluate position and orientation of slides 408*a-c* or scanner. In some embodiments, alignment baseline 412 may be fixed relative to stage 404 and used across multiple scanning operations for deviation comparison. In FIG. 4A, image data 400*a* illustrates a scenario in which slide 408*a* is deviated relative to alignment baseline 412. In a non-limiting example, FIG. 4A may illustrate a slide placement error of positional deviation. In FIG. 4B, image data 400*b* illustrates a stage 404 skewed relative to slide 408*b*, a fixed camera frame or reference coordinate system. In a non-limiting example, FIG. 4B may illustrate a scanner misalignment. In FIG. 4C, image data 400*c* illustrates slide 408*c* including a chip along one edge and a smudge partially obscuring one or more corners of the slide 408*c*.

Figure 5:
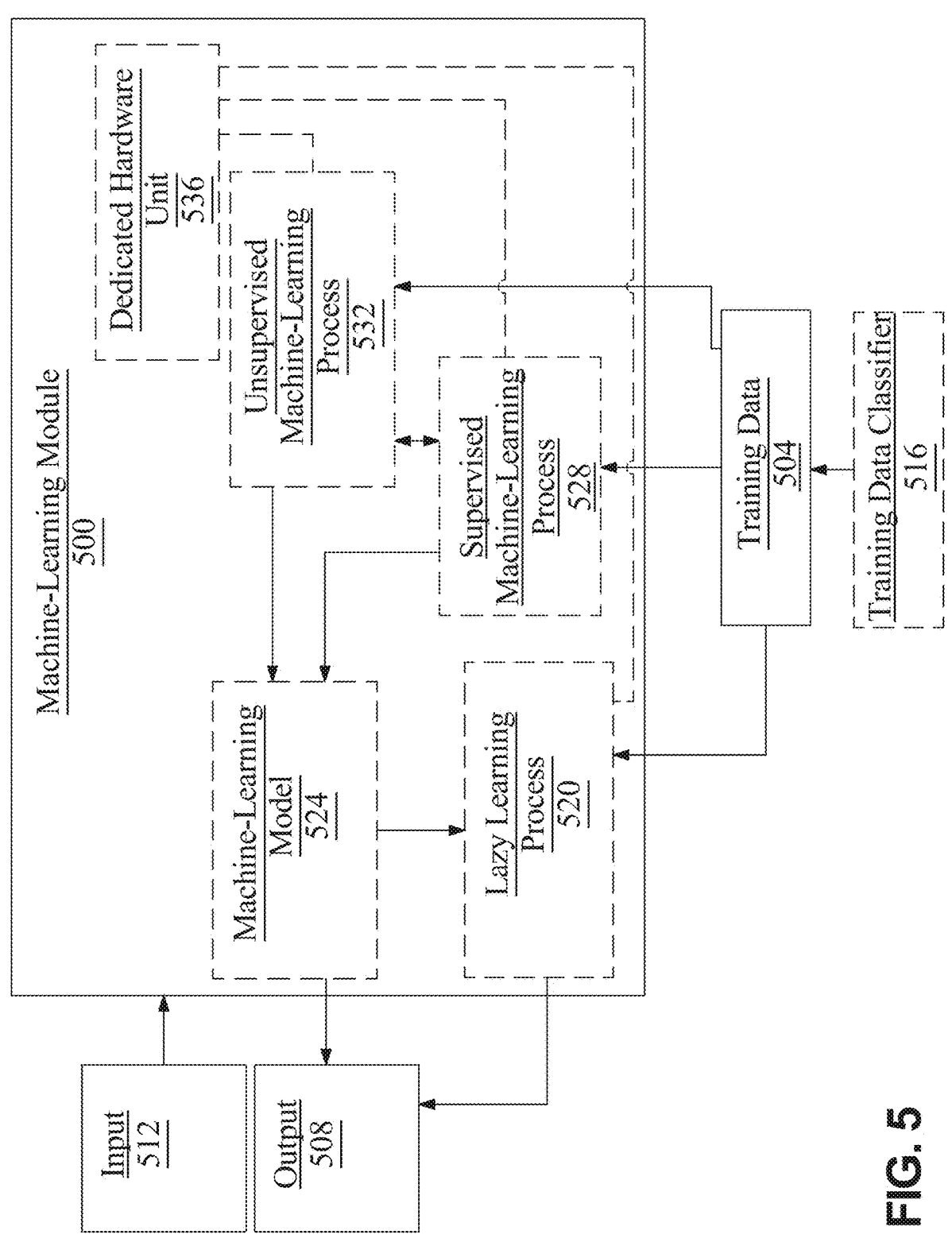
FIG. 5 illustrates a block diagram of an exemplary machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, input data may include sensor data, image data, and the like. As another non-limiting example, output data may include positional deviation or correction procedure.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to slide cohorts related to sample information or a type of study or research related to the slide or sample.

Still referring to FIG. 5, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$: and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include sensor data, image data, and the like as described above as inputs, positional deviation or correction procedure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 432 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
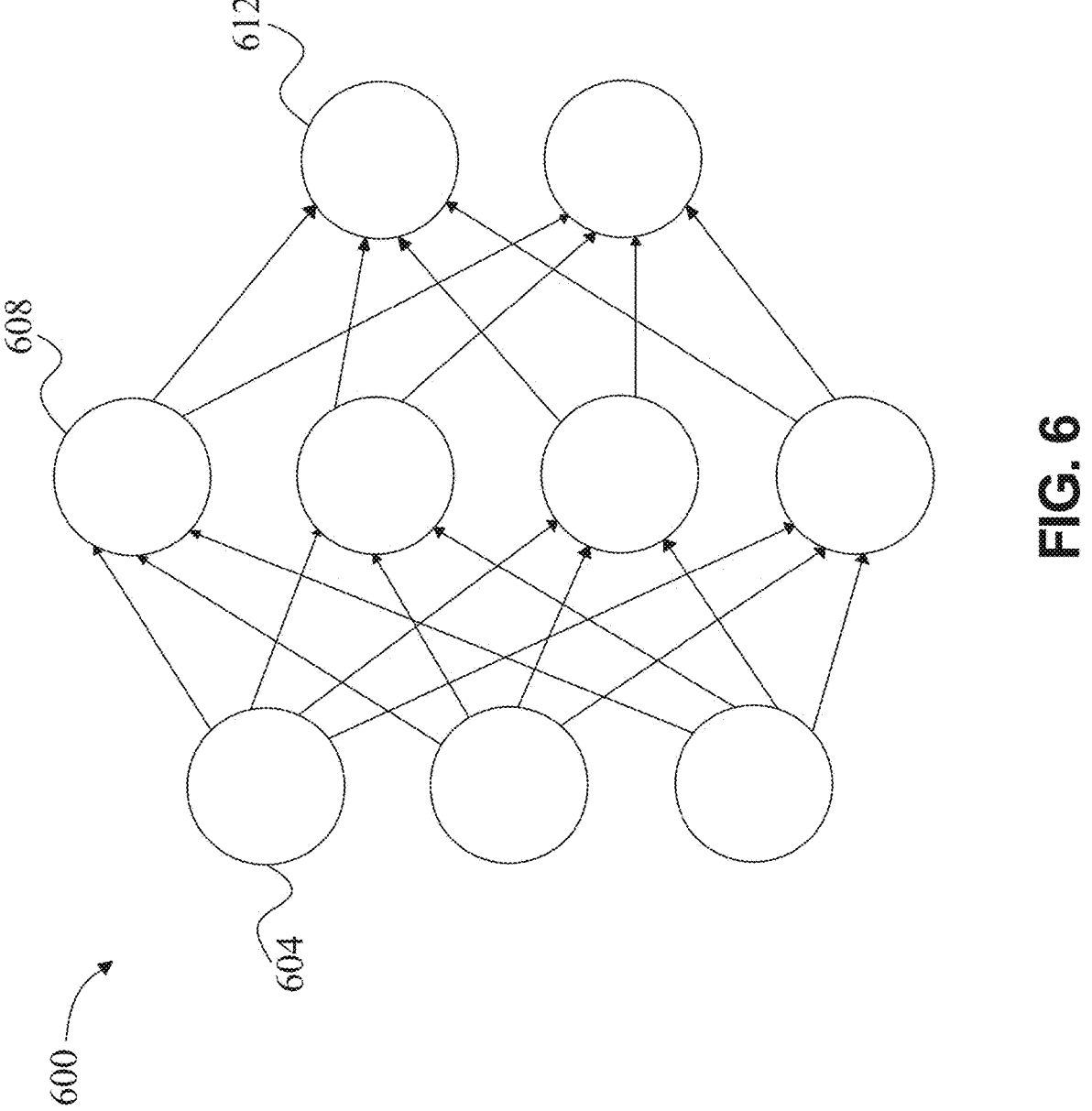
FIG. 6 illustrates a diagram of an exemplary neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
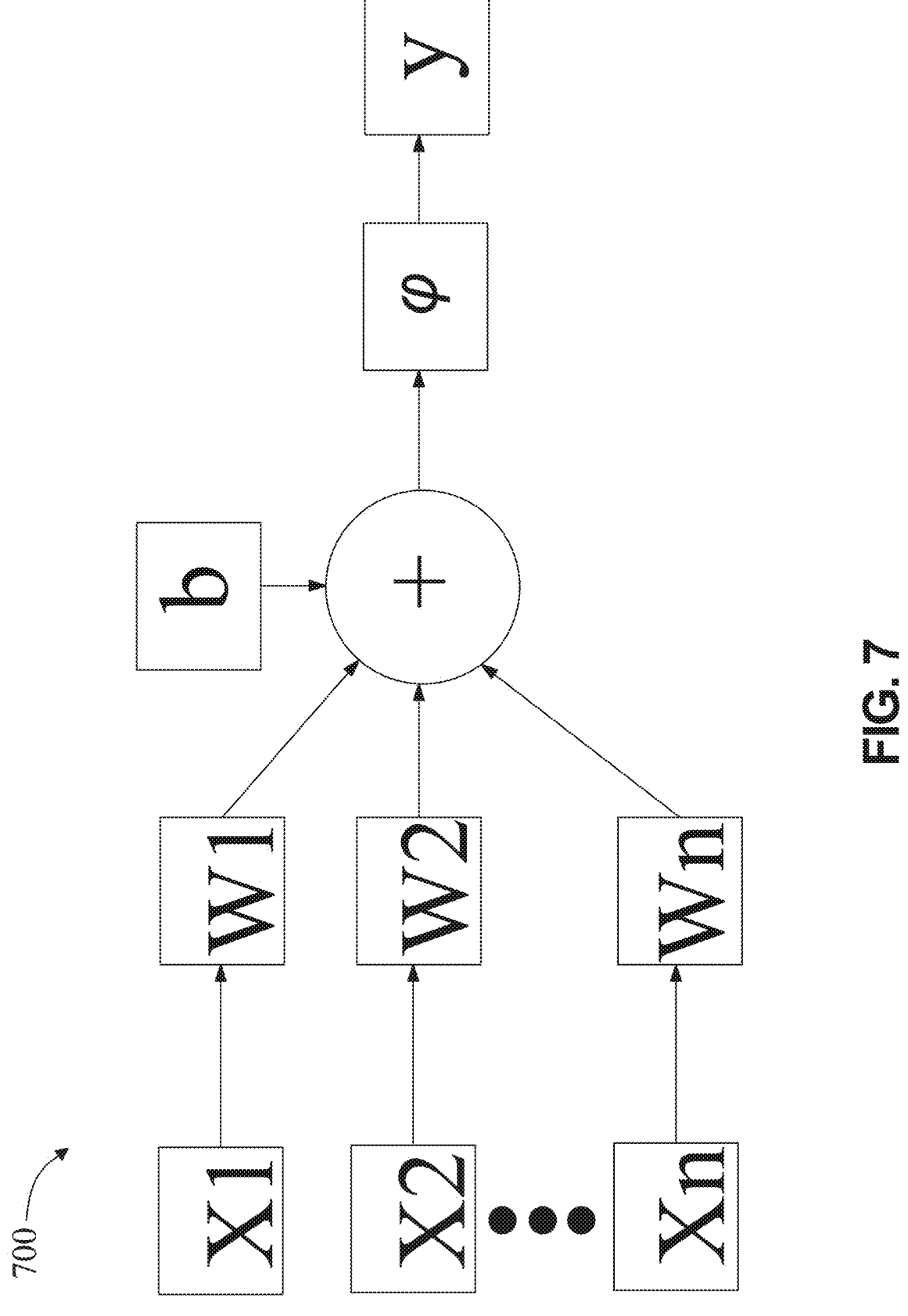
FIG. 7 illustrates a block diagram of an exemplary node in a neural network.

Referring now to FIG. 7 an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x; that may be used as activation functions. As a non-limiting and illustrative example, node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
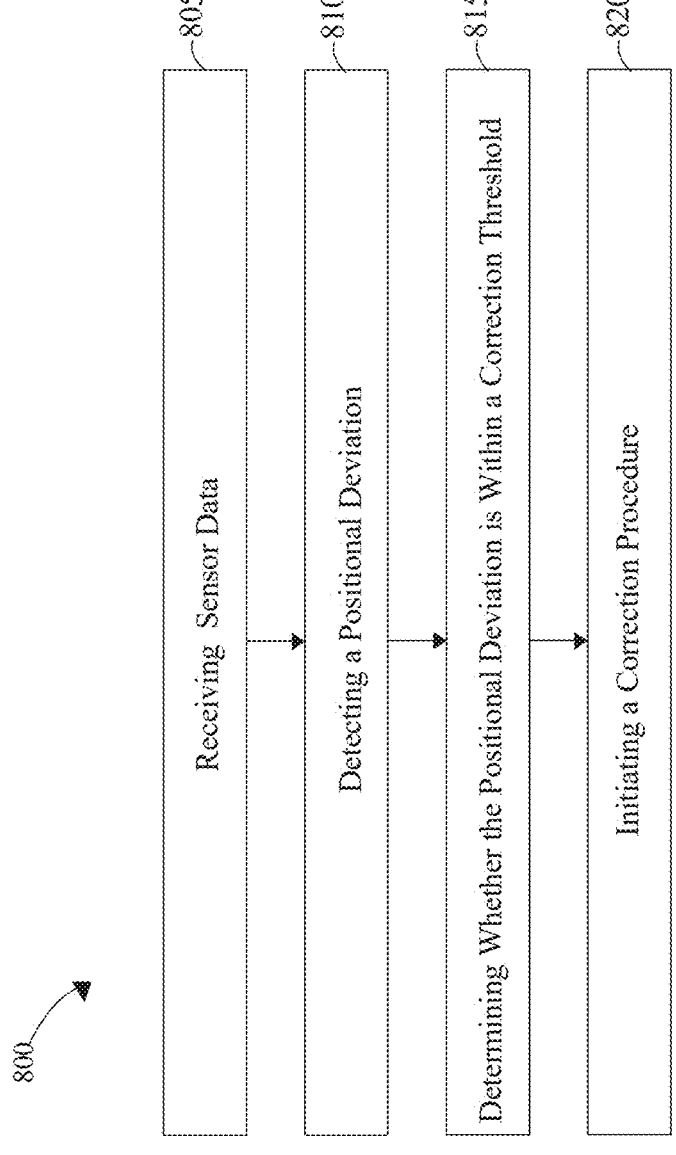
FIG. 8 illustrates a flow diagram of an exemplary method for automated optical deviation detection and correction procedure.

Referring now to FIG. 8, a flow diagram of an exemplary method 800 for automated optical deviation detection and correction procedure. Method 800 contains a step 805 of receiving, using at least a processor, sensor data from one or more sensors positioned on a scanner, wherein the sensor data includes image data received from at least an optical sensor of the one or more sensors and associated with at least a slide placed on the scanner and a tactile datum received from a force-torque sensor of the one or more sensors, wherein the scanner includes a stage configured to hold the slide. These may be implemented as reference to FIGS. 1-6.

With continued reference to FIG. 8, method 800 contains a step 810 of detecting, using at least a processor, a positional deviation in image data relative to an alignment baseline. In some embodiments, the positional deviation may be associated at least one of a scanner misalignment or a slide misalignment. In some embodiments, detecting the positional deviation may include identifying at least one boundary of the slide in the image data using an edge detection algorithm and determining the positional deviation as a function of a difference between the at least one boundary and a reference boundary of the alignment baseline. In some embodiments, detecting the positional deviation may include spatially aligning the tactile datum to the image data, wherein spatially aligning the tactile datum to the image data may include spatially aligning the tactile datum to the image data may include mapping the image data into a coordinate system and transforming coordinates of the tactile datum into the coordinate system to spatially align the tactile datum to the image data. These may be implemented as reference to FIGS. 1-6.

With continued reference to FIG. 8, method 800 contains a step 815 of determining, using at least a processor, whether a positional deviation is within a correction threshold. This may be implemented as reference to FIGS. 1-6.

With continued reference to FIG. 8, method 800 contains a step 820 of initiating, using at least a processor, a correction procedure associated with at least a slide, wherein initiating the correction procedure includes: generating a correction datum if the positional deviation is within the correction threshold; and generating a deviation flag if the positional deviation exceeds the correction threshold. In some embodiments, generating the correction datum may include executing the correction datum by generating and transmitting, to a robotic arm, an actuator control signal to reposition the at least a slide to be in closer alignment with the alignment baseline. In some embodiments, generating the deviation flag may include disabling scanning operations upon repeated generation of the deviation flag exceeding a flag threshold count over a defined time interval. In some embodiments, generating the correction datum may include: identifying a type of the positional deviation as a function of deviation patterns of historical positional deviations; and generating the correction datum as a function of the type of the positional deviation. In some embodiments, method 800 may further include generating, using the at least a processor, a correction data structure summarizing the correction procedure; and generating, using the at least a processor, a user interface including the correction data structure. In some embodiments, method 800 may further include recording, using the at least a processor, deviation metrics over a plurality of scan operations; comparing, using the at least a processor, the recorded deviation metrics to a defined statistical operating range; and generating, using the at least a processor, a maintenance alert based on a trend analysis of the recorded deviation metrics. In some embodiments, determining the defined statistical operating range may include: determining a standard deviation of prior system performance data; and determining the defined statistical operating range as a function of the standard deviation. These may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
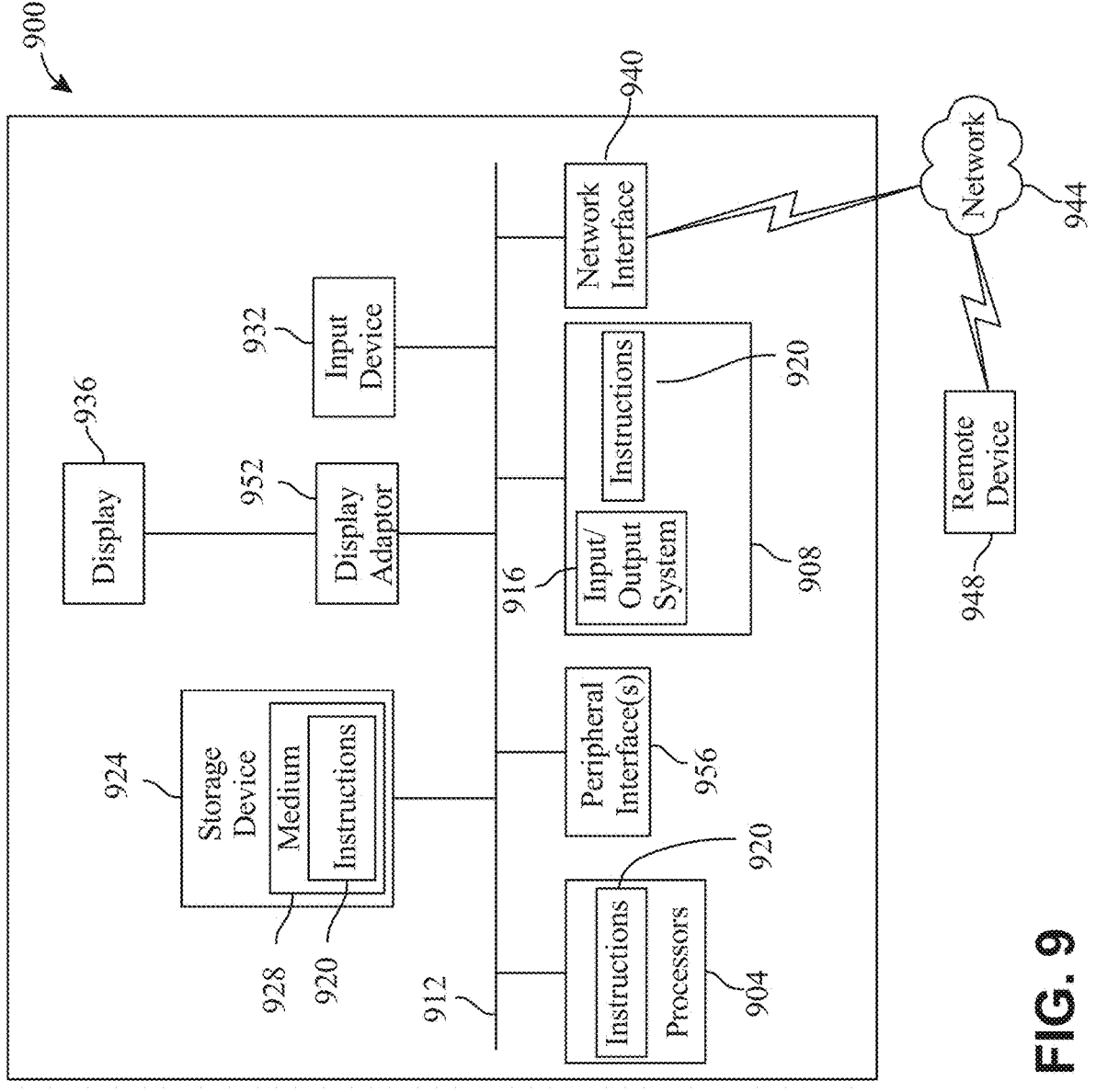
FIG. 9 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912. Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention. Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for automated optical deviation detection and correction procedure, the system comprising:
    a scanner, wherein the scanner comprises:
        at least two sensors positioned on the scanner, wherein the at least two sensors comprise at least an optical sensor and a force-torque sensor; and
        a stage configured to hold a slide;
    at least a processor; and
    a non-transitory memory communicatively connected to the at least a processor, wherein the non-transitory memory contains instructions configuring the at least a processor to:
        receive sensor data from the one or more sensors, wherein the sensor data comprises:
            image data received from the optical sensor and associated with at least a slide; and
            a tactile datum received from the force-torque sensor;
        detect a positional deviation in the image data relative to an alignment baseline;
        determine whether the positional deviation is within a correction threshold; and
        initiate a correction procedure associated with the at least a slide, wherein
            initiating the correction procedure comprises:
            generating a correction datum if the positional deviation is within the correction threshold; and
            generating a deviation flag if the positional deviation exceeds the correction threshold.

2. The system of claim 1, wherein the positional deviation is associated with at least one of a scanner misalignment or a slide misalignment.

3. The system of claim 1, wherein detecting the positional deviation comprises:
    identifying at least one boundary of the slide in the image data using an edge detection algorithm; and
    determining the positional deviation as a function of a difference between the at least one boundary and a reference boundary of the alignment baseline.

4. The system of claim 1, wherein detecting the positional deviation comprises spatially aligning the tactile datum to the image data, wherein spatially aligning the tactile datum to the image data comprises:
    mapping the image data into a coordinate system; and
    transforming coordinates of the tactile datum into the coordinate system to spatially align the tactile datum to the image data.

5. The system of claim 1, wherein generating the correction datum comprises executing the correction datum by generating and transmitting, to a robotic arm, an actuator control signal to reposition the at least a slide to be in closer alignment with the alignment baseline.

6. The system of claim 1, wherein generating the deviation flag comprises disabling scanning operations upon repeated generation of the deviation flag exceeding a flag threshold count over a defined time interval.

7. The system of claim 1, wherein generating the correction datum comprises:
    identifying a type of the positional deviation as a function of deviation patterns of historical positional deviations; and
    generating the correction datum as a function of the type of the positional deviation.

8. The system of claim 1, wherein the non-transitory memory contains instructions further configuring the at least a processor to:
    generate a correction data structure summarizing the correction procedure; and
    generate a user interface comprising the correction data structure.

9. The system of claim 1, wherein the non-transitory memory contains instructions further configuring the at least a processor to:
    record deviation metrics over a plurality of scan operations;
    compare the recorded deviation metrics to a defined statistical operating range; and
    generate a maintenance alert based on a trend analysis of the recorded deviation metrics.

10. The system of claim 9, wherein determining the defined statistical operating range comprises:
    determining a standard deviation of prior system performance data; and
    determining the defined statistical operating range as a function of the standard deviation.

11. A method for automated optical deviation detection and correction procedure, the method comprising:
    receiving, using at least a processor, sensor data from at least two sensors positioned on a scanner, wherein the sensor data comprises image data received from at least an optical sensor of the at least two sensors and associated with at least a slide placed on the scanner and a tactile datum received from a force-torque sensor of the at least two sensors, wherein the scanner includes a stage configured to hold the slide;
    detecting, using the at least a processor, a positional deviation in the image data relative to an alignment, wherein detecting the positional deviation comprises spatially aligning the tactile datum to the image data;
    determining, using the at least a processor, whether the positional deviation is within a correction threshold; and
    initiating, using the at least a processor, a correction procedure associated with the at least a slide, wherein initiating the correction procedure comprises:

generating a correction datum if the positional deviation is within the correction threshold; and generating a deviation flag if the positional deviation exceeds the correction threshold.

12. The method of claim 11, wherein the positional deviation is associated with at least one of a scanner misalignment or a slide misalignment.

13. The method of claim 11, wherein detecting the positional deviation comprises:

identifying at least one boundary of the slide in the image data using an edge detection algorithm; and determining the positional deviation as a function of a difference between the at least one boundary and a reference boundary of an alignment baseline.

14. The method of claim 11, wherein detecting the positional deviation comprises spatially aligning the tactile datum to the image data, wherein spatially aligning the tactile datum to the image data comprises:

mapping the image data into a coordinate system; and transforming coordinates of the tactile datum into the coordinate system to spatially align the tactile datum to the image data.

15. The method of claim 11, wherein generating the correction datum comprises executing the correction datum by generating and transmitting, to a robotic arm, an actuator control signal to reposition the at least a slide to be in closer alignment with an alignment baseline.

16. The method of claim 11, wherein generating the deviation flag comprises disabling scanning operations upon repeated generation of the deviation flag exceeding a flag threshold count over a defined time interval.

17. The method of claim 11, wherein generating the correction datum comprises:

identifying a type of the positional deviation as a function of deviation patterns of historical positional deviations; and generating the correction datum as a function of the type of the positional deviation.

18. The method of claim 11, further comprising:

generating, using the at least a processor, a correction data structure summarizing the correction procedure; and generating, using the at least a processor, a user interface comprising the correction data structure.

19. The method of claim 11, further comprising:

recording, using the at least a processor, deviation metrics over a plurality of scan operations;

comparing, using the at least a processor, the recorded deviation metrics to a defined statistical operating range; and generating, using the at least a processor, a maintenance alert based on a trend analysis of the recorded deviation metrics.

20. The method of claim 19, wherein determining the defined statistical operating range comprises:

determining a standard deviation of prior system performance data; and determining the defined statistical operating range as a function of the standard deviation.

* * * * *